(12) United States Patent
Kojima et al.

(10) Patent No.: US 8,970,528 B2
(45) Date of Patent: Mar. 3, 2015

(54) INFORMATION INPUT DEVICE, INFORMATION INPUT METHOD, AND PROGRAM

(75) Inventors: Yoshihiro Kojima, Hyogo (JP); Tomonari Takahashi, Osaka (JP); Yoichi Ikeda, Osaka (JP); Kumi Harada, Osaka (JP); Masaki Yamauchi, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 292 days.

(21) Appl. No.: 13/698,808

(22) PCT Filed: May 23, 2011

(86) PCT No.: PCT/JP2011/002840
§ 371 (c)(1),
(2), (4) Date: Nov. 19, 2012

(87) PCT Pub. No.: WO2011/151988
PCT Pub. Date: Dec. 8, 2011

(65) Prior Publication Data
US 2013/0063386 A1 Mar. 14, 2013

(30) Foreign Application Priority Data
Jun. 3, 2010 (JP) ................................. 2010-128255

(51) Int. Cl.
*G06F 3/041* (2006.01)
*G06F 3/0354* (2013.01)
*G06F 3/0488* (2013.01)

(52) U.S. Cl.
CPC .......... *G06F 3/0414* (2013.01); *G06F 3/03547* (2013.01); *G06F 3/0488* (2013.01); *G06F 3/0416* (2013.01)

USPC .......................................................... 345/173

(58) Field of Classification Search
CPC . G06F 3/03547; G06F 3/0414; G06F 3/0416; G06F 3/0488
USPC .......................................................... 345/173
See application file for complete search history.

(56) References Cited

U.S. PATENT DOCUMENTS 7,310,088 B2    12/2007   Senzui et al.
(Continued)

FOREIGN PATENT DOCUMENTS

JP      2000-311052      11/2000
JP      2003-276525      10/2003
(Continued)

OTHER PUBLICATIONS

International Search Report issued Aug. 16, 2011 in corresponding International Application No. PCT/JP2011/002840.
Reply to Written Opinion issued Aug. 16, 2011 in International Application No. PCT/JP2011/002840 (with English translation).

*Primary Examiner* — Viet Pham
(74) *Attorney, Agent, or Firm* — Wenderoth, Lind & Ponack, L.L.P.

(57) ABSTRACT

In order to provide an information input device that solves the misclick caused by a clickable touch sensor without using information corresponding to pressure of the user's finger, the information input device includes: a touch information detecting unit that detects a touch information item obtained when a finger of the user is in contact with the touch sensor; a touch information sequence storage unit configured to store the touch information item for a predetermined period; and a pressing start position estimating unit configured to estimate a pressing start position at which the user started to press the touch sensor with the finger, based on touch information items stored in the touch information sequence storage unit, when the switch was pressed down, the touch information items including the touch information item.

18 Claims, 19 Drawing Sheets

(56) References Cited

U.S. PATENT DOCUMENTS

2003/0184517 A1 10/2003 Senzui et al.
2007/0273671 A1* 11/2007 Zadesky et al. ............... 345/173
2009/0273573 A1* 11/2009 Hotelling ...................... 345/173
2010/0171711 A1* 7/2010 Mak-Fan et al. ............. 345/173

FOREIGN PATENT DOCUMENTS

| JP | 2003-280807 | 10/2003 |
| JP | 2005-352924 | 12/2005 |
| JP | 2006-350931 | 12/2006 |
| JP | 4020246 | 12/2007 |

* cited by examiner

INFORMATION INPUT DEVICE, INFORMATION INPUT METHOD, AND PROGRAM

TECHNICAL FIELD

The present invention relates to, for example, an information input device that operates a graphical user interface (GUI) screen of an electronic device, and in particular to, for example, an information input device including a clickable touch sensor that operates the GUI screen with a touch sensor.

BACKGROUND ART

In electronic devices including displays, such as PCs and mobile phones, touch sensors, for example, touch pads are well known as one type of input devices that operate GUI screens displayed on the displays. In an information input device including a touch sensor, the user traces the touch sensor with a finger to enable moving of a cursor on the GUI screen, thus resulting in an intuitive GUI operation according to movement of the user's finger.

In addition to a location input operation of moving a cursor on a screen, the general GUI operations need an operation of determining an object such as an icon and a button on the screen, for example, an operation represented by a left click of a mouse.

The information input devices including the conventional touch sensors perform such an operation of determining an object by pressing a button placed near the touch sensor once or twice or by lightly tapping the surface of the touch sensor once or twice.

For example, any icon on a screen is selected and determined (executed) by (i) tracing the surface of the touch sensor with a finger to move a cursor on the screen to a target icon, (ii) once moving the finger away from the touch sensor, and (iii) pressing a button placed near the touch sensor twice or by lightly tapping the surface of the touch sensor twice.

In this case, since the user needs to move the finger away from the touch sensor at least once, there is a problem that the user cannot continuously and naturally move the finger.

Here, a clickable touch sensor is known as one of the solutions for improving the operability of a general touch sensor. The touch sensor is movable upward and downward, and includes a mechanical switch immediately underneath the touch sensor (See PTL 1).

The clickable touch sensor can select and determine an object on the GUI screen by pressing the touch sensor to press down the switch immediately underneath the touch sensor. For example, the user can select and determine (execute) any icon on the GUI screen by tracing the surface of the touch sensor, moving a cursor on the screen to the target icon, and pressing down the touch sensor.

In other words, such an information input device including a clickable touch sensor can continuously and naturally perform an operation without moving the finger away from the touch sensor, thus improving the operability of the user more than the conventional touch sensors.

While the operability has been improved, there are cases where, when the user presses a switch below a clickable touch sensor with the finger, the finger horizontally moves with the pressure and the position of the cursor is displaced (hereinafter referred to as "misclick").

In particular, when the size of objects on the screen is small and a space between the adjacent objects is narrow, in the case where the position of the cursor is slightly displaced, an object near the target object is selected and determined, and erroneous operations frequently occur.

In order to solve the problem of the misclick on the clickable touch sensor, PTL 2 suggests a method for preventing the misclick, using an information input device including a touch sensor having variable flexibility with the pressure of a finger operation of the user.

FIG. 18 illustrates an information input system using a clickable touch sensor having the conventional misclick prevention function described in PTL 2.

As illustrated in FIG. 18, the information input system includes a clickable touch sensor 100, a touch information detecting unit 103, a screen display device 500, a cursor position calculating unit 106, a cursor display control unit 108, an object placement storage unit 109, an object display control unit 111, an object selection detecting unit 112, an object determining unit 113, and a cursor movement invalidating unit 114.

The clickable touch sensor 100 includes a touch sensor 101 and a mechanical switch 102.

The touch sensor 101 is a device having variable flexibility with the pressure of the user's finger in a pressing direction, and has a property of increasing the number of touch positions to be detected according to the magnitude of the pressure of the user's finger.

The switch 102 is placed vertically downward with respect to an operation surface of the touch sensor 101 (that is, back side of the touch sensor 101). When the user presses the touch sensor 101 with the pressure higher or equal to a predetermined value, the switch 102 is also pressed down to be turned ON.

The touch information detecting unit 103 detects a touch position when the user's finger is in contact with the touch sensor 101 and the number of touch positions corresponding to the pressure to the touch sensor 101.

The screen display device 500 includes a display screen, such as a liquid crystal display. On the display screen included in the screen display device 500, a GUI screen that is an operation screen of an electronic device operated by the clickable touch sensor 100 is displayed.

The cursor position calculating unit 106 calculates a position of a cursor on the GUI screen to be displayed on the screen display device 500.

The cursor display control unit 108 displays, on the GUI screen, a cursor at the position calculated by the cursor position calculating unit 106.

The object placement storage unit 109 stores object placement information of each object, such as an icon, a button, and a menu. The object placement information indicates how to place the object on the GUI screen.

The object display control unit 111 displays each object on the GUI screen based on the object placement information.

The object selection detecting unit 112 detects an object currently selected by the user from among a plurality of objects displayed on the GUI screen, based on the position of the cursor. The object determining unit 113 determines the object detected by the object selection detecting unit 112, when the user pressed the switch 102 of the clickable touch sensor 100.

When the user performs a determination operation on the object currently selected by the user, the cursor movement invalidating unit 114 detects a pressing operation of the user before the user presses the touch sensor 101 to turn ON the switch 102 and the pressing information is output, and invalidates movement of the cursor on the GUI screen during a period from detection of the pressing operation to turning OFF of the switch 102.

FIG. 19 is an external view of a GUI screen of a conventional information input device.

As illustrated in FIG. 19, a GUI screen 105 for operating an electronic device is displayed on the screen display device 500.

On the GUI screen 105, a cursor 107, and objects 110(a) to 110(c) are displayed.

The cursor 107 is displayed on the GUI screen 105, and is operated as a pointer by the information input device.

The operations performed by the information input system using a clickable touch sensor having the conventional misclick prevention function with the aforementioned configuration will be hereinafter described.

Here, a series of operations performed by the user who selects and determines (executes) the target object 110(b) from among the objects 110(a) to 110(c) placed on the GUI screen 105 displayed by the screen display device 500 will be described with reference to FIG. 19.

When the user traces the touch sensor 101 to move the cursor 107 displayed on the GUI screen 105, the touch information detecting unit 103 detects the position that is in contact with the user's the finger on the touch sensor 101.

The cursor position calculating unit 106 determines a position of the cursor 107 to be displayed on the GUI screen 105, based on the touch position obtained by the touch information detecting unit 103.

The cursor display control unit 108 displays, on the GUI screen 105, the cursor 107 at the position calculated by the cursor position calculating unit 106.

Furthermore, the object selection detecting unit 112 determines whether or not the cursor 107 is on the display area of the objects 110(a) to 110(c) by reading, from the object placement storage unit 109, the object placement information of each of the objects 110(a) to 110(c) displayed on the GUI screen 105 and comparing the object placement information with the position of the cursor obtained from the cursor position calculating unit 106.

For example, when the cursor 107 is on a display area of the object 110(b) as illustrated in the GUI screen of FIG. 19, the object selection detecting unit 112 determines that the cursor 107 is on the display area of the object 110(b) and outputs an ID number of the object 110(b) to the object display control unit 111.

Upon receipt of the ID number of the object 110(b) from the object selection detecting unit 112, the object display control unit 111 displays the object 110(b), for example, presents selection of the object 110(b) by changing the size and color of the object 110(b).

Furthermore, in order to determine the object 110(b) selected by the user, when the touch sensor 101 is pressed down to turn ON the switch 102, the switch 102 outputs the pressing information to the object selection detecting unit 112.

Upon receipt of the pressing information from the switch 102, the object selection detecting unit 112 outputs the ID number of the detected object 110(b) to the object determining unit 113.

Upon receipt of the ID number of the object 110(b) from the object selection detecting unit 112, assuming that the user determines the object 110(b), the object determining unit 113 outputs the ID number to the object display control unit 111 and performs a determination process corresponding to the object 110(b).

Upon receipt of the ID number of the object 110(b) from the object determining unit 113, the object display control unit 111 displays the object 110(b), for example, presents determination of the object 110(b) by changing the size and color of the object 110(b).

Since the touch sensor 101 is a device having the variable flexibility in a pressing direction as described above, although the touch information detecting unit 103 detects only one touch position when the user lightly touches the touch sensor 101 with the finger, it can detect a plurality of touch positions corresponding to a predetermined pressure or more when the finger presses the touch sensor 101 with the pressure.

The cursor movement invalidating unit 114 determines whether or not the number of touch positions obtained from the touch information detecting unit 103 is larger than or equal to a predetermined value, and outputs cursor movement invalidating information to the cursor position calculating unit 106 when the number is larger.

Upon receipt of the cursor movement invalidating information, the cursor position calculating unit 106 continues to hold the position of the cursor 107 before receipt of the invalidating information without change from its receipt.

In other words, the cursor movement invalidating unit 114 determines that the user will perform an operation of pressing down the switch 102 when the user presses the touch sensor 101 with a predetermined pressure or more, and invalidates change in the position of the cursor 107 after the determination.

Thus, even when the user's finger is horizontally displaced by the pressure of pressing the switch 102, the position of the cursor remains unchanged from the position before being pressed down. Thus, the cursor 107 is never horizontally displaced, or misclicked.

CITATION LIST

Patent Literature

[PTL 1] Japanese Unexamined Patent Application Publication No. 2000-311052
[PTL 2] Japanese Patent No. 4020246

SUMMARY OF INVENTION

Technical Problem

With the conventional configuration, an operation of pressing the switch 102 by the user's finger is detected only based on the pressure to the touch sensor 101. Thus, even the user traces the touch sensor 101 with the finger at fast speed with slightly excessive force, there are cases where the cursor movement invalidating unit 114 determines the operation as the pressing operation and invalidates the cursor movement operation.

In particular, the user who is not familiar with the operation of the clickable touch sensor 100 cannot easily trace the touch sensor lightly. Thus, a problem that the cursor movement operation is frequently invalidated or suspended occurs.

Furthermore, the conventional configuration requires the touch information detecting unit 103 to detect information corresponding to pressure with which the user presses the touch sensor 101 with the finger, that is, detect the number of touch positions, in order to prevent misclick of the user on the clickable touch sensor 100.

Thus, when a touch sensor having no change in the number of touch positions according to the pressure is used, there is another problem that misclick on the touch sensor cannot be prevented.

To sum up, although the touch sensor 101 that is a device having variable flexibility with the pressure of the user's finger can detect a plurality of touch positions when the user presses the touch sensor 101 with a predetermined pressure or more in the conventional example, a capacitive touch sensor that determines a touch position using change in a capacitance value between the finger and the touch sensor cannot obtain information corresponding to the pressure and prevent the misclick.

The present invention has been conceived to solve the conventional problems, and has an object of providing an information input device that can solve the problem of misclick on a clickable touch sensor without using information corresponding to the pressure of the user's finger.

Solution to Problem

In order to solve the conventional problems, an information input device according to an aspect of the present invention is an information input device including a clickable touch sensor including a touch sensor that can be vertically moved and a switch that is placed vertically downward with respect to an operation surface of the touch sensor and is pressed down by a user pressing the touch sensor, and the information input device includes: a touch information detecting unit configured to detect a touch information item obtained when a finger of the user is in contact with the touch sensor; a touch information sequence storage unit configured to store the touch information item for a predetermined period; and a pressing start position estimating unit configured to estimate a pressing start position at which the user started to press the touch sensor with the finger, based on touch information items stored in the touch information sequence storage unit, when the switch was pressed down, the touch information items including the touch information item.

With the configuration, when the user presses the switch of the clickable touch sensor for performing a determination operation on the object, the pressing start position estimating unit estimates a position at which the user originally desired to press the switch, based on the touch information item stored in the touch information sequence storage unit. An information input device having a misclick prevention function in which the operability is more improved can be provided using the estimated position as a correct pressing position instead of the position at which the switch is completely pressed down. Furthermore, since the pressing start position is estimated from the touch positions and times corresponding to the touch positions that are stored in the touch information sequence storage unit, it is possible to provide the information input device having the misclick prevention function and including a general touch sensor that cannot output information corresponding to the pressure of the user's finger.

Preferably, the information input device may further include a cursor position calculating unit configured to calculate a position of a cursor on a graphical user interface (GUI) screen, based on the touch information items stored in the touch information sequence storage unit or the pressing start position estimated by the pressing start position estimating unit.

Preferably, the information input device may further include: an object placement storage unit configured to store object placement information indicating an area of the GUI screen in which at least one object is placed; an object display control unit configured to display the at least one object on the GUI screen based on the object placement information obtained from the object placement storage unit; and an object selection detecting unit configured to detect an object selected by the user from among the at least one object, based on the object placement information and the position of the cursor obtained from the cursor position calculating unit.

The information input device may further include a misclick correction control unit configured to determine whether or not the pressing start position estimating unit estimates the pressing start position, based on object placement information of the object detected by the object selection detecting unit and the position of the cursor obtained from the cursor position calculating unit.

With the configuration, the information input device can determine whether or not estimation of a pressing start position is necessary, and perform a process of estimating the pressing start position only when necessary. Thus, the information input device can improve a response speed of a whole input operation. In particular, when the size of an object on the GUI screen is sufficiently larger than the maximum displacement width caused by the misclick, it is less likely that the erroneous operation is performed. Thus, the response speed of a whole input operation can be more improved than that according to Embodiment 1.

The information input device may further include a misclick correction control unit configured to determine whether or not the pressing start position estimating unit estimates the pressing start position, based on object placement information between a first object detected by the object selection detecting unit and at least one second object closer to the first object.

As such, the misclick correction control unit dynamically changes a threshold for determining whether or not the misclick correction is to be performed, based on a placement relationship between an object selected by the user and an object closer to the selected object. Thus, the information input device with a superior response speed and less erroneous operation caused by the misclick can be provided.

Preferably, the pressing start position estimating unit may include: a pressing start time estimating unit configured to estimate a pressing start time at which the user started to press the touch sensor with the finger, based on the touch information items stored in the touch information sequence storage unit, when the switch was pressed down; and a touch position determining unit configured to determine a contact position between the finger of the user and the touch sensor at the pressing start time, with reference to the touch information items stored in the touch information sequence storage unit.

Specifically, the pressing start time estimating unit may include: a movement amount calculating unit configured to calculate at least one type of an amount of movement of the finger on the touch sensor, based on the touch information items stored in the touch information sequence storage unit; and a stop time detecting unit configured to estimate a time at which the finger stopped, based on the amount of movement.

More specifically, each of the touch information items may include a touch position that is a position at which the finger was in contact with the touch sensor, the movement amount calculating unit may be configured to calculate a movement speed of the finger as the amount of movement, using a first touch position and a second touch position that are included in the touch information items, and the stop time detecting unit may be configured to determine, as the time at which the finger stopped, a time at which the movement speed is lower than or equal to a predetermined value to estimate the determined time as the pressing start time.

Accordingly, it is possible to estimate a pressing start position at which the user originally desired to press the touch sensor, based on coordinates at which the movement speed of the finger with which the user operates the touch sensor is lower than or equal to a threshold for the first time, and perform processing assuming that the clickable touch sensor is clicked at the estimated position. Thus, it is possible to provide an information input device with a misclick prevention function in which the operability can be more improved than that of the conventional information input device, using a general touch sensor that cannot output information corresponding to the pressure of the user's finger.

Furthermore, the pressing start time estimating unit may further include: a touch area calculating unit configured to determine a touch area that is an area of the touch sensor in contact with the finger, based on the touch information items stored in the touch information sequence storage unit; a pressed area arrival time detecting unit configured to determine a pressed area arrival time at which the touch area obtained from the touch area calculating unit reached a predetermined threshold; and a pressing start time determining unit configured to determine the pressing start time at which the user started to press the touch sensor with the finger, using the time estimated by the stop time detecting unit and the pressed area arrival time determined by the pressed area arrival time detecting unit.

Accordingly, it is possible to estimate a pressing start position at which the user originally desired to press the touch sensor, based on change in an area that is in contact with the finger and the touch sensor when the clickable touch sensor was pressed, in addition to the movement speed of the finger, and perform processing assuming that the clickable touch sensor is clicked at the estimated position. Thus, it is possible to reduce an erroneous operation caused by the misclick with higher accuracy.

Furthermore, the pressing start time estimating unit may include: a movement amount calculating unit configured to calculate at least one type of an amount of movement of the finger on the touch sensor, based on the touch information items stored in the touch information sequence storage unit; and a misclick start time detecting unit configured to detect presence or absence of misclick of the finger on the touch sensor, using the amount of movement, and determine, when detecting the presence of the misclick, a time immediately previous to a time at which the user misclicked.

Specifically, the pressing start time estimating unit may further include a moving direction calculating unit configured to calculate a moving direction of the finger on the touch sensor, based on the touch information items stored in the touch information sequence storage unit, and the misclick start time detecting unit may be configured to detect the presence or absence of the misclick of the finger on the touch sensor, using the amount of movement obtained from the movement amount calculating unit and the moving direction obtained from the moving direction calculating unit, and determine, when detecting the presence of the misclick, a time immediately previous to the time at which the user misclicked, using the amount of movement and the moving direction.

Thus, even when it is difficult to accurately detect a stop state of the finger after the user started to press the touch sensor, since the movement amount of the user's finger is relatively small, the information input device can detect abrupt change in a moving direction of the finger in addition to a movement speed of the finger, and using the detected information, detect the misclick and estimate the pressing start time with higher accuracy.

Furthermore, the pressing start time estimating unit may further include: a touch area calculating unit configured to determine a touch area that is an area of the touch sensor in contact with the finger, based on the touch information items stored in the touch information sequence storage unit; and a pressed area arrival time detecting unit configured to determine a pressed area arrival time at which the touch area obtained from the touch area calculating unit reached a predetermined threshold, and the misclick start time detecting unit may be configured to detect the presence or absence of the misclick of the finger on the touch sensor, using the pressed area arrival time obtained from the pressed area arrival time detecting unit, the amount of movement obtained from the movement amount calculating unit, and the moving direction obtained from the moving direction calculating unit, and determine, when detecting the presence of the misclick, a time immediately previous to the time at which the user misclicked, using the amount of movement and the moving direction.

Thus, it is possible to more accurately detect a time at which the user stopped moving the finger to turn ON the switch and pressed the touch sensor with the fingertip, and calculate a pressing start time with higher accuracy by narrowing down the possible period during which the misclick may occur. Furthermore, it is possible to reduce the workload for detecting the misclick. Thus, it is possible to accurately determine a touch position at which the user started to press the touch sensor, reduce an erroneous operation caused by the misclick, and accelerate the processing for preventing the misclick.

An information input device according to another aspect of the present invention is an information input device including a clickable touch sensor including a touch sensor that can be vertically moved and a switch that is placed vertically downward with respect to an operation surface of the touch sensor and is pressed down by a user pressing the touch sensor, and the information input device includes: a touch information detecting unit configured to detect a touch information item obtained when a finger of the user is in contact with the touch sensor; a touch information sequence storage unit configured to store the touch information item for a predetermined period; an object placement storage unit configured to store object placement information indicating an area of a GUI screen in which at least one object is placed; an object display control unit configured to display the at least one object on the GUI screen based on the object placement information obtained from the object placement storage unit; a cursor position calculating unit configured to calculate a position of a cursor on the GUI screen, based on the touch information items stored in the touch information sequence storage unit; an object selection detecting unit configured to detect an object selected by the user from among the at least one object, based on the object placement information and the position of the cursor obtained from the cursor position calculating unit; and an object lock control unit configured to determine whether or not to prevent the user from selecting an object other than the object detected by the object selection detecting unit, based on the touch information items stored in the touch information sequence storage unit.

Specifically, the object lock control unit may include: an object lock determining unit configured to perform an object lock determination process for determining whether or not to prevent the user from selecting the object other than the object detected by the object selection detecting unit, based on the touch information items stored in the touch information sequence storage unit; and an object lock determination process control unit configured to determine whether or not to perform the object lock determination process, based on placement information of the object detected by the object selection detecting unit and the position of the cursor obtained from the cursor position calculating unit.

In other words, even when the user moves the finger on the touch sensor and somewhat strongly presses the touch sensor, the user can successively input touch positions and improve the operability. Furthermore, according to Embodiments, a general touch sensor that can detect a position of a finger can prevent the misclick.

Furthermore, the object lock control unit may include: an object lock determining unit configured to perform an object lock determination process for determining whether or not to prevent the user from selecting the object other than the object detected by the object selection detecting unit, based on the touch information items stored in the touch information sequence storage unit; and an object lock determination process control unit configured to determine whether or not to perform the object lock determination process, based on placement information between a third object detected by the object selection detecting unit and at least one fourth object closer to the detected third object.

Accordingly, it is possible to provide an information input device that can lock an object that is a target that the user originally desired to press to prevent displacement of a pointer from the object, that performs a less erroneous operation caused by the misclick, and that has a superior response speed.

Preferably, the object lock determining unit may include: a movement amount calculating unit configured to calculate at least one type of an amount of movement of the finger on the touch sensor, based on the touch information items stored in the touch information sequence storage unit; and an object lock information generating unit configured to determine whether or not to prevent the user from selecting the object other than the object detected by the object selection detecting unit, based on the amount of movement, and generate object lock information according to a result of the determination.

Advantageous Effects of Invention

It is possible to provide an information input device that can solve the problem of misclick caused by a clickable touch sensor, without using information corresponding to the pressure of the user's finger.

DESCRIPTION OF EMBODIMENTS

Embodiments according to the present invention will be described with reference to the drawings.

Embodiment 1

Figure 1:
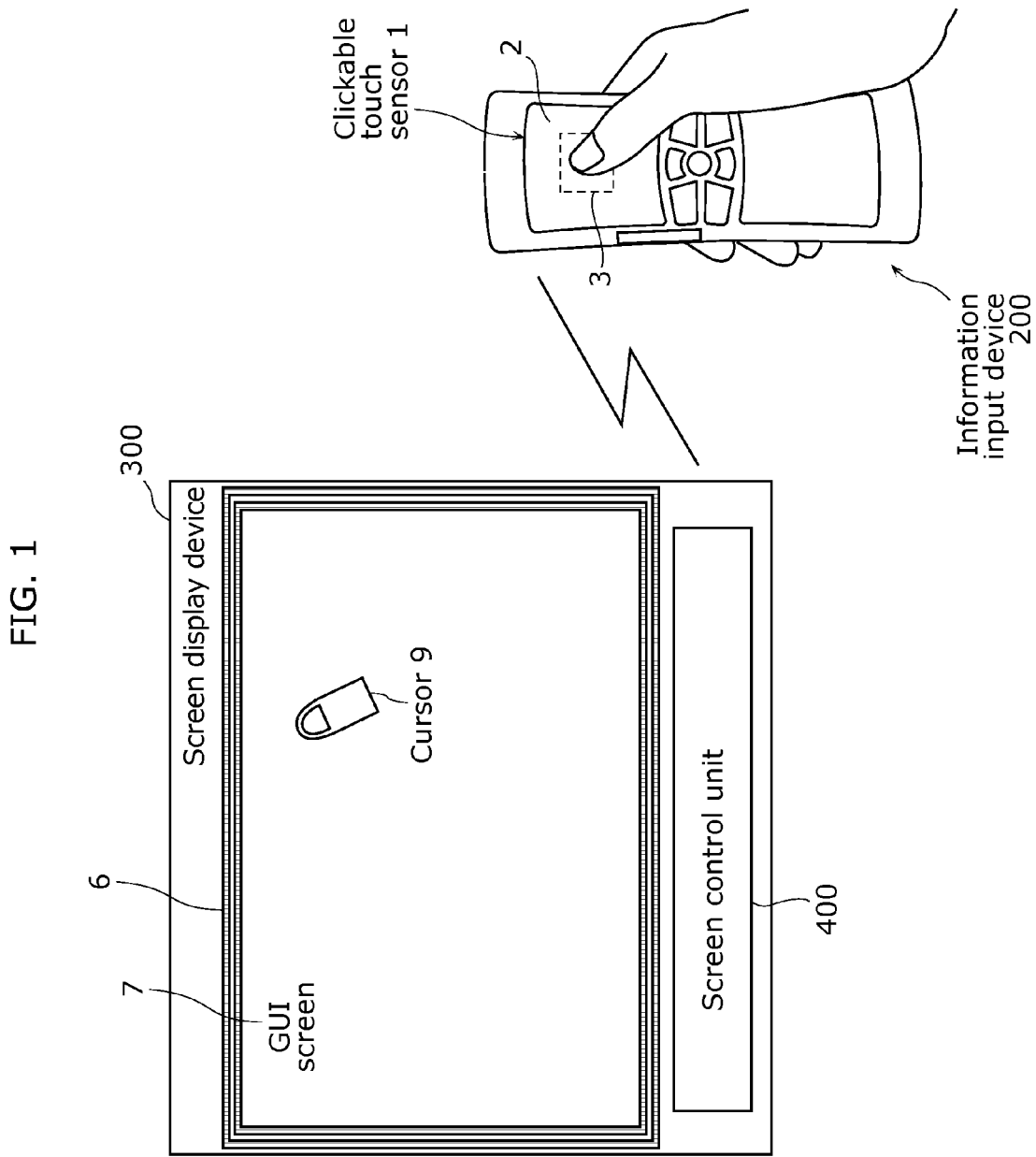
FIG. 1 is an external view of an information input system using an information input device according to Embodiment 1 in the present invention.

FIG. 1 is an external view of an information input system using an information input device according to Embodiment 1 in the present invention.

As illustrated in FIG. 1, the information input system includes an information input device 200 and a screen display device 300.

The information input device 200 is an operation device for operating a GUI screen 7 displayed by the screen display device 300.

The screen display device 300 is a display device for displaying the GUI screen 7 for operating an electronic device.

The information input device 200 includes a clickable touch sensor 1 as a sensor for receiving an operation of the user's finger. Furthermore, the clickable touch sensor 1 includes a touch sensor 2 and a switch 3.

The user moves the finger in contact with the touch sensor 2 included in the clickable touch sensor 1 as a conventional touch sensor so that a cursor on the GUI screen 7 can be moved.

The touch sensor 2 can be vertically moved with a spring configuration supported from the back side. Furthermore, the switch 3 is placed vertically downward with respect to the operation surface of the touch sensor 2, and is pressed down by the user pressing the touch sensor 2. In other words, the user can operate the switch 3 installed on the back side of the touch sensor 2 (ON-OFF operation) by pressing the touch sensor 2 with the finger or moving the finger off the touch sensor 2. Accordingly, the user can perform an operation called a click operation without moving the finger off the touch sensor 2 under the GUI environment.

The screen display device 300 includes a screen display unit 6 and a screen control unit 400.

The screen display unit 6 is a display device, such as a liquid crystal display. On the screen display unit 6, the GUI screen 7 for operating (i) an electronic device operated by the information input device 200, such as AV equipment including a television and a digital video recorder (DVR), and a personal computer (PC) and (ii) information equipment such as a mobile phone is displayed.

Furthermore, objects, such as icon buttons and menus, and a cursor 9 for pointing these are displayed on the GUI screen 7.

The screen control unit 400 is a control unit that generates the GUI screen 7 and displays the GUI screen 7 on the screen display unit 6.

Figure 2:
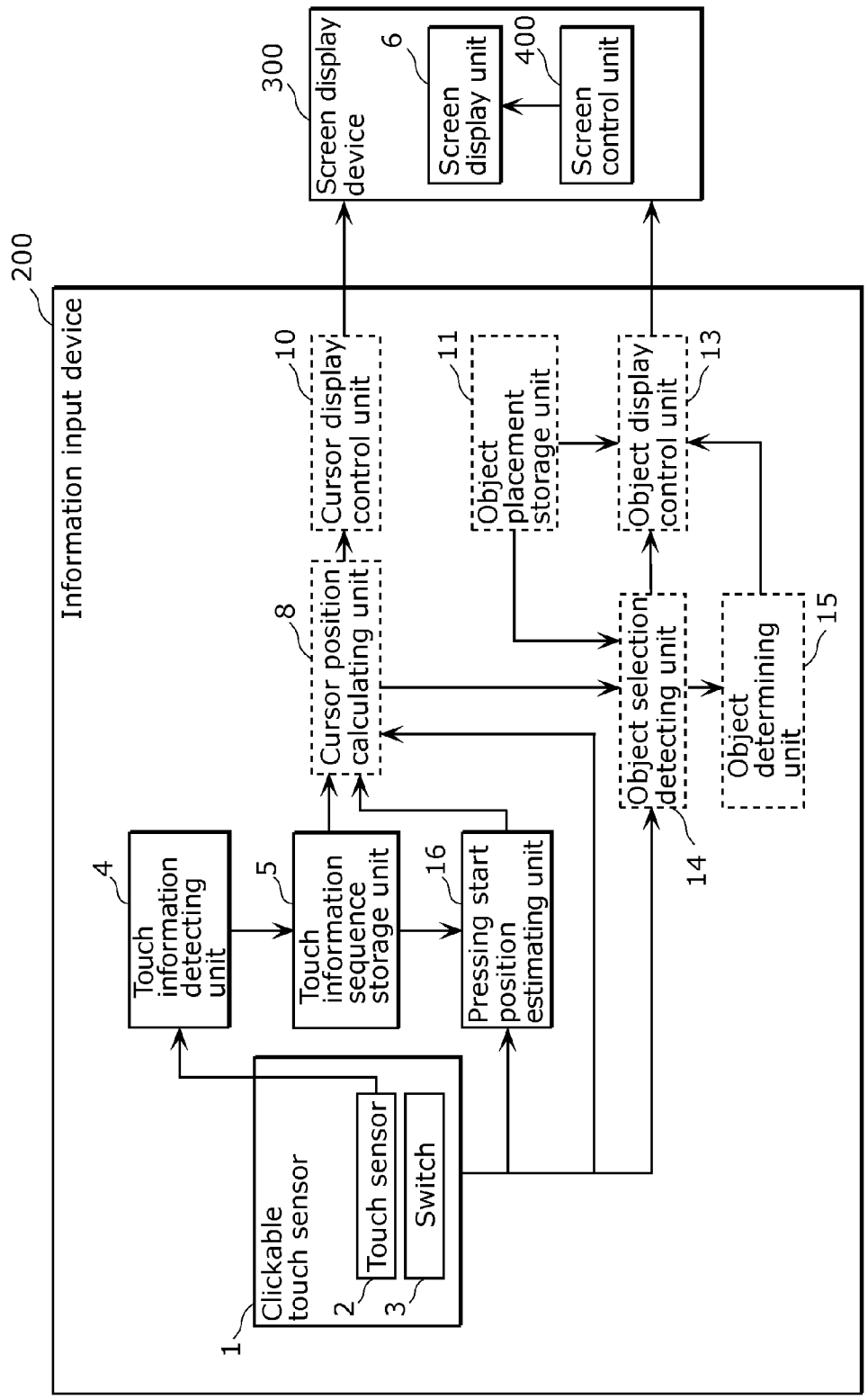
FIG. 2 is a block diagram illustrating a configuration of the information input device according to Embodiment 1.

FIG. 2 is a block diagram of an information input device 200 according to Embodiment 1 in the present invention.

As illustrated in FIG. 2, the information input device 200 includes the clickable touch sensor 1, a touch information detecting unit 4, a touch information sequence storage unit 5, a cursor position calculating unit 8, a cursor display control unit 10, an object placement storage unit 11, an object display control unit 13, an object selection detecting unit 14, an object determining unit 15, and a pressing start position estimating unit 16.

The clickable touch sensor 1 is a sensor that inputs an operation with the user's finger as described above.

The touch sensor 2 is a device that detects a position at which the finger is in contact with the surface of the touch sensor 2, and outputs an electronic signal corresponding to the touched position.

Although the type for detecting the user's finger by the touch sensor 2 may be any of a capacitive type, a resistive type, a surface acoustic wave type, an infrared type, an electromagnetic induction type, and so on, Embodiment 1 will be described using a capacitive touch sensor of the capacitive type.

The switch 3 is, for example, a mechanical switch, and alternately switches between an ON state and an OFF state with a pressing operation.

The switch 3 is placed vertically downward with respect to the input surface of the touch sensor 2 (that is, back side of the touch sensor 2). The clickable touch sensor 1 is constructed in such a manner that when the user presses the touch sensor 2 with a pressure of a predetermined value or more, the switch 3 is also pressed down and is turned ON, with the spring configuration and others supporting the touch sensor 2.

In order to reduce the thickness of the device, a piezoelectric sensor that is turned ON with a predetermined pressure or more that is equivalent to a force for pressing a spring may be used instead of a mechanical switch.

The touch information detecting unit 4 detects a touch information item obtained when the user's finger is in contact with the touch sensor 2, using the electronic signal obtained from the capacitive touch sensor 2.

The touch information item is, for example, a touch position at which the user's finger is in contact with the touch sensor 2, and a capacitive value that varies according to a touch time at which the user's finger is in contact with the touch sensor 2 and a touch area in which the finger is in contact with the touch sensor 2.

The touch information sequence storage unit 5 stores the touch information item detected by the touch information detecting unit 4 during a predetermined period.

The cursor position calculating unit 8 calculates a position of the cursor 9 (see FIG. 5 to be described later) to be displayed on the GUI screen 7.

The cursor display control unit 10 displays, on the GUI screen 7, the cursor 9 at the position calculated by the cursor position calculating unit 8.

The object placement storage unit 11 stores object placement information of each of objects 12(*a*) to 12(*c*), such as an icon, a button, and a menu. The object placement information indicates how to place the object on the GUI screen 7 in FIG. 5.

Specifically, the object placement information is a position at which the object should be displayed on the GUI screen 7, and is expressed by, for example, two-dimensional or three-dimensional coordinates.

The object display control unit 13 displays each of the objects 12(*a*) to 12(*c*) on the GUI screen 7 based on the object placement information obtained from the object placement storage unit 11. Specifically, the object display control unit 13 reads the object placement information of each of the objects 12(*a*) to 12(*c*) stored in the object placement storage unit 11, and displays the object on the GUI screen 7 based on the corresponding object placement information.

Furthermore, the object display control unit 13 presents, to the user, the selection of the object by changing a size, a color, and others of the object currently selected by the user.

The object selection detecting unit 14 detects the object currently selected by the user from among the objects 12(*a*) to 12(*c*) displayed on the GUI screen, based on the position of the cursor 9.

The object determining unit 15 determines the object detected by the object selection detecting unit 14, when the user pressed the switch 3 of the clickable touch sensor 1. Specifically, the object determining unit 15 outputs an ID number of the object to the object display control unit 13. Furthermore, the object determining unit 15 performs a determination process corresponding to the object as necessary.

When the user pressed the switch 3 on the GUI screen 7 for determining the object selected by the user, the pressing start position estimating unit 16 estimates a pressing start position that is a touch position at which the user started to press the touch sensor 2 with the finger, based on the touch information item stored in the touch information sequence storage unit 5.

Figure 5:
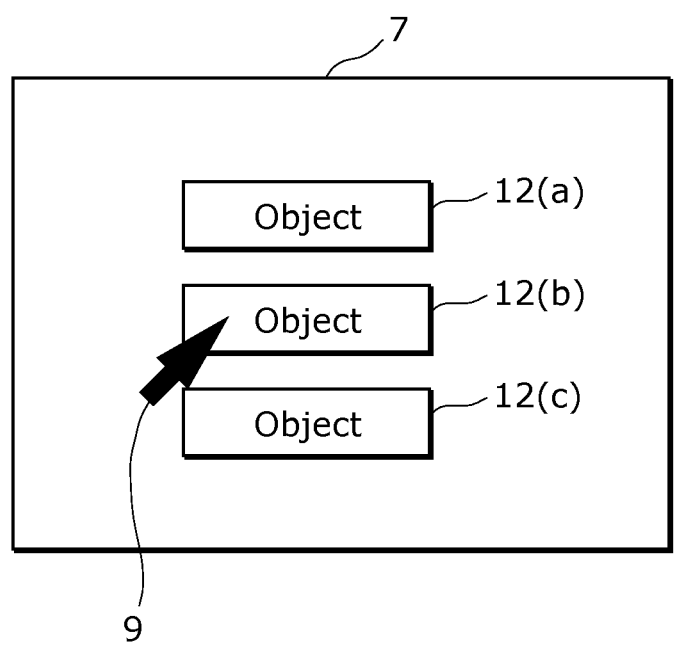
FIG. 5 illustrates a GUI screen according to Embodiment 1.

FIG. 5 illustrates the GUI screen 7 according to Embodiment 1.

As illustrated in FIG. 5, the cursor 9 and the objects 12(*a*) to 12(*c*) are displayed on the GUI screen 7.

The GUI screen 7 is an operation environment using a GUI for operating an electronic device operated by the information input device 200.

The cursor 9 is displayed on the GUI screen 7, and points to an object on the GUI screen 7 as a pointer based on output from the information input device 200.

Each of the objects 12(*a*) to 12(*c*) is, for example, an icon, a button, and a menu used in the GUI environment.

Figure 3:
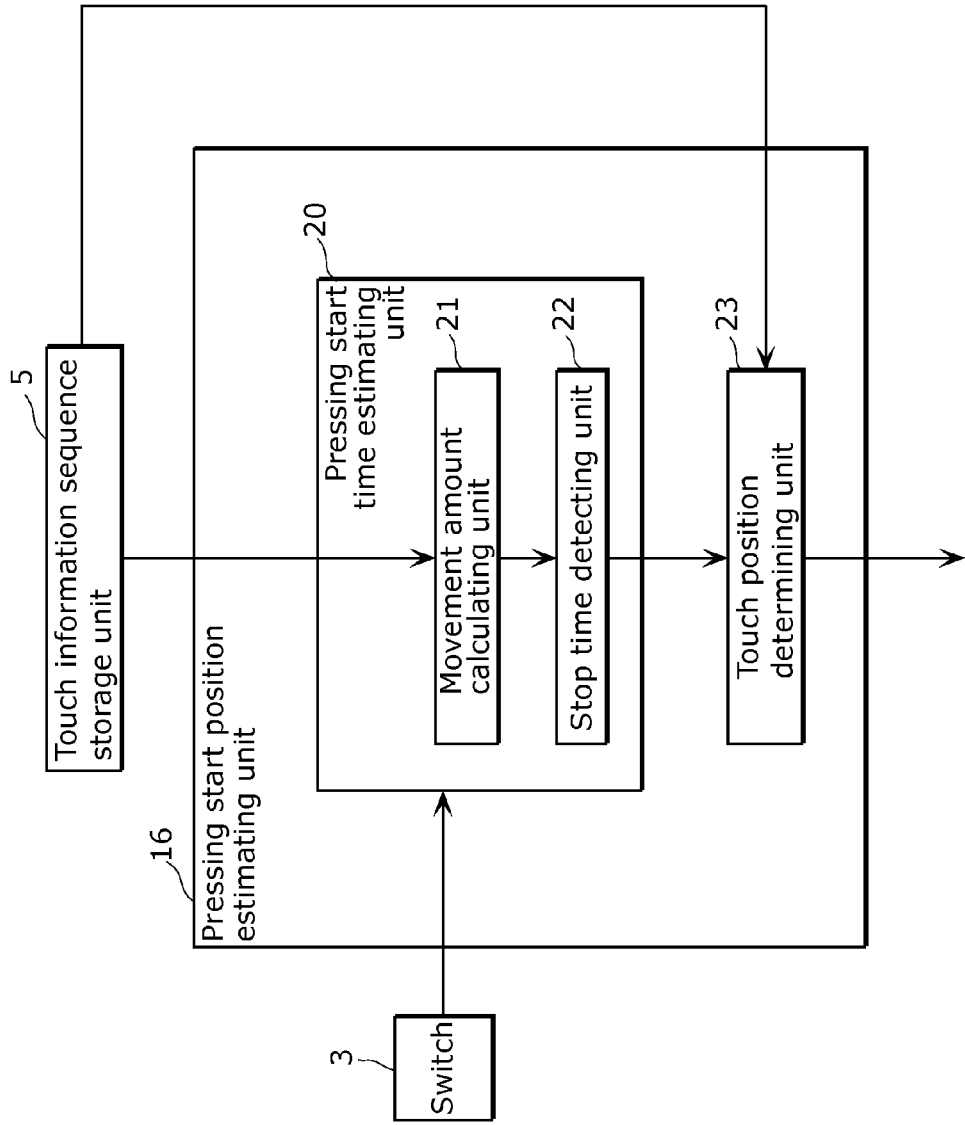
FIG. 3 is a block diagram illustrating a configuration of a pressing start position estimating unit of the information input device according to Embodiment 1.

Next, FIG. 3 is a block diagram illustrating a configuration of the pressing start position estimating unit 16 according to Embodiment 1.

As illustrated in FIG. 3, the pressing start position estimating unit 16 includes a pressing start time estimating unit 20 and a touch position determining unit 23.

The pressing start time estimating unit 20 estimates a pressing start time at which the user started to press the touch sensor 2 with the finger, based on the touch information item stored in the touch information sequence storage unit 5.

The touch position determining unit 23 determines a contact position between the user's finger and the touch sensor 2 at the pressing start time, with reference to the pressing start time obtained from the pressing start time estimating unit 20 and the touch information item (touch time and touch position) stored in the touch information sequence storage unit 5.

Then, the touch position determining unit 23 estimates the position as the pressing start position at which the user started to press the touch sensor 2 with the finger, and outputs the position to the cursor position calculating unit 8.

The pressing start time estimating unit 20 includes a movement amount calculating unit 21 and a stop time detecting unit 22.

The movement amount calculating unit 21 calculates at least one type of an amount of movement of the user's finger on the touch sensor 2, based on the touch information item stored in the touch information sequence storage unit 5. Examples of the amount of movement include a movement distance, a movement speed, and a movement acceleration of the user's finger on the touch sensor 2 for a predetermined period. For example, the movement amount calculating unit 21 calculates a movement speed of the finger as the amount of movement, using a first touch position and a second touch position that are included in the touch information items.

The stop time detecting unit 22 determines a time at which the user's finger stopped on the touch sensor 2, using the amount of movement obtained from the movement amount calculating unit 21. For example, the stop time detecting unit 22 determines, as the time at which the finger stopped, a time at which the movement speed is lower than or equal to a predetermined value to estimate the determined time as the pressing start time.

Figure 4:
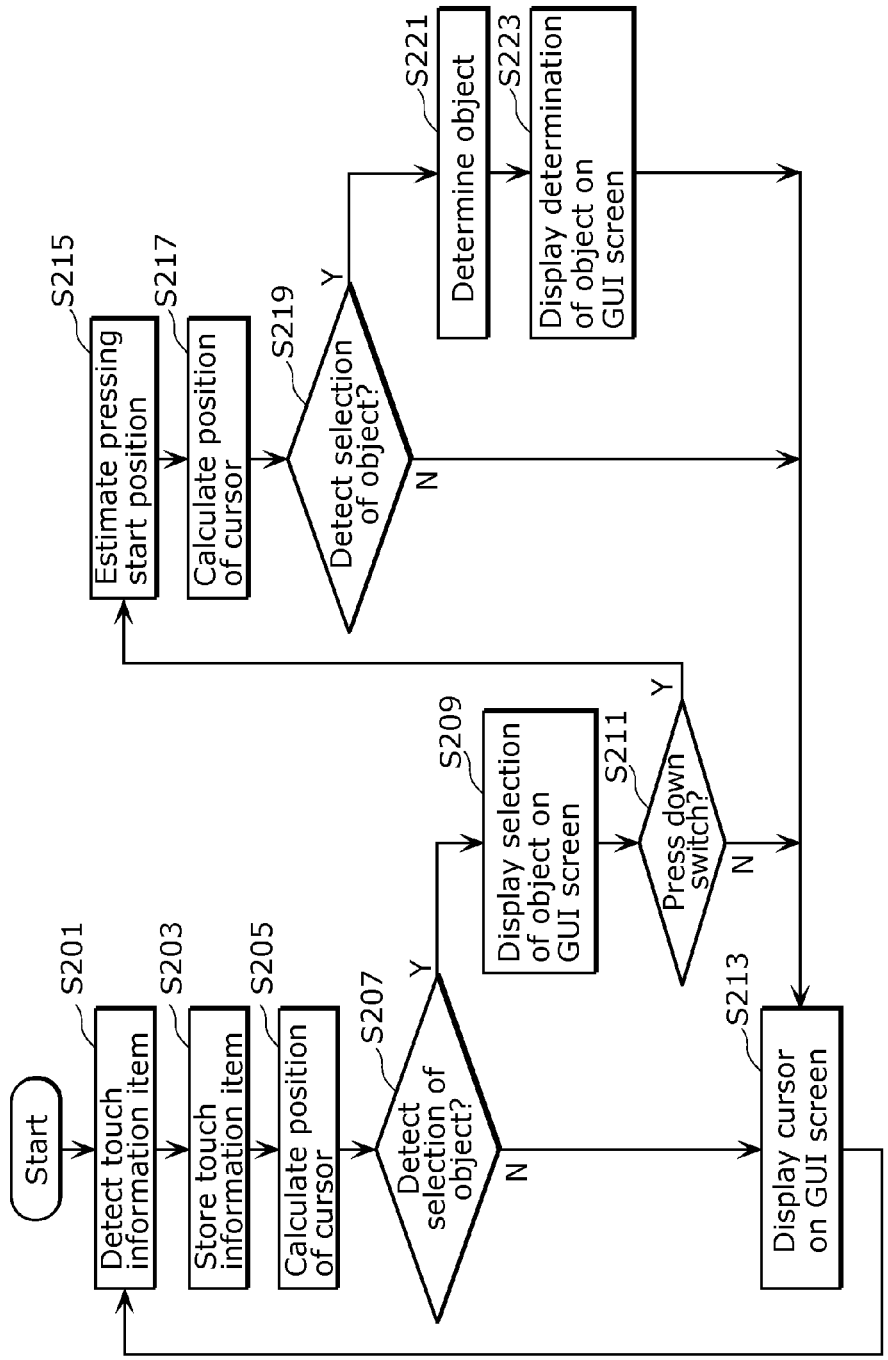
FIG. 4 is a flowchart of processes performed by the information input device according to Embodiment 1.

FIG. 4 is a flowchart of processes performed by the information input device according to Embodiment 1.

The operations performed by the information input device with the aforementioned configuration according to Embodiment 1 will be hereinafter described. Here, a series of operations in which the user selects and determines (executes), using the clickable touch sensor 1, the target object 12(*b*) from among the objects 12(*a*) to 12(*c*) placed on the GUI screen 7 displayed by the screen display unit 6 will be described as a specific example.

When the user traces the surface of the touch sensor 2 to move the cursor 9 displayed on the GUI screen 7, the touch information detecting unit 4 detects, from the touch sensor 2, the position (touch position) and the time (touch time) at which the user's finger is in contact with the touch sensor 2, and a capacitive value when the finger is in contact with the touch sensor 2 (S201), and sequentially stores the position, the time, and the value in the touch information sequence storage unit 5 (S203).

Furthermore, the cursor position calculating unit 8 calculates the position of the cursor 9 to be displayed on the GUI screen 7, using at least one touch position stored in the touch information sequence storage unit 5 (S205). For example, the cursor position calculating unit 8 calculates the position of the cursor 9 to be displayed on the GUI screen 7, using the latest touch position.

Next, the cursor display control unit 10 displays, on the GUI screen 7 of the screen display unit 6, the cursor 9 at the position calculated by the cursor position calculating unit 8. Furthermore, the object display control unit 13 reads the object placement information of each of the objects 12(*a*) to 12(*c*) stored in the object placement storage unit 11, and displays the object on the GUI screen 7 of the screen display unit 6 based on the corresponding object placement information.

Next, the object selection detecting unit 14 reads the object placement information of each of the objects 12(*a*) to 12(*c*) displayed on the GUI screen 7, from the object placement storage unit 11. Then, the object selection detecting unit 14 compares the read object placement information with the position of the cursor obtained from the cursor position calculating unit 8 to determine whether or not the cursor 9 is on the display area of each of the objects (S207).

When the cursor 9 is on the display area of any one of the objects 12(*a*) to 12(*c*) (Yes at S207), the object selection detecting unit 14 determines that the user selects the corresponding object and outputs an ID number of the object to the object display control unit 13.

Upon receipt of the ID number of the object from the object selection detecting unit 14, the object display control unit 13 displays the object corresponding to the ID number, for example, presents selection of the object to the user by changing the size and color of the object. More specifically, the object display control unit 13 enlarges the size of the object corresponding to the ID number provided from the object selection detecting unit 14.

When the object selection detecting unit 14 determines that the cursor 9 is not on the display area of the object (No at S207), the cursor display control unit 10 informs the touch information detecting unit 4 to start the processes again (S201).

The processes will be more specifically described with reference to FIG. 5.

Assume that the user moves the cursor 9 to the object 12(*b*) on the GUI screen 7 by moving the finger on the touch sensor 2.

Here, the object selection detecting unit 14 determines that the cursor 9 is on the display area of the object 12(*b*) (Yes at S207), and outputs the ID number of the object 12(*b*) to the object display control unit 13.

Next, upon receipt of the ID number of the object 12(*b*) from the object selection detecting unit 14, the object display control unit 13 displays the object 12(*b*) on the GUI screen 7, for example, presents selection of the object 12(*b*) to the user by changing the size and color of the object (S209).

Next, when the user presses down the touch sensor 2 for turning ON the switch 3 to determine the selected object (object 12(*b*) in the former example) (Yes at S211), the switch 3 outputs the pressing information to the pressing start position estimating unit 16, the cursor position calculating unit 8, and the object selection detecting unit 14.

Upon receipt of the pressing information from the switch 3, the pressing start position estimating unit 16 obtains, from the pressing start time estimating unit 20, the pressing start time that is an estimated value of the time at which the user started to press the touch sensor 2 with the finger.

Furthermore, the touch position determining unit 23 determines a contact position between the finger and the touch sensor 2 at the pressing start time, with reference to the pressing start time obtained from the pressing start time estimating unit 20 and the touch information item stored in the touch information sequence storage unit 5 (S215), and outputs, to the cursor position calculating unit 8, the position as a pressing start position when the user started to press the touch sensor 2 with the finger. For example, assuming the pressing start time as Ts, the touch position (x(Ts), y(Ts)) at the time is output from the touch position determining unit 23 to the cursor position calculating unit 8 as a pressing start position.

Next, upon receipt of the pressing information from the switch 3, the cursor position calculating unit 8 calculates the position of the cursor to be displayed on the GUI screen 7 using the pressing start position calculated by the pressing start position estimating unit 16, instead of the touch position stored in the touch information sequence storage unit 5 (S217).

Then, the object selection detecting unit 14 determines whether or not the position of the cursor 9 obtained by the cursor position calculating unit 8 is on the display area of an object (for example, each of the objects 12(*a*) to 12(*c*)) in the same manner as when the switch 3 is not turned ON (S219).

As a result, when the cursor 9 overlaps a display area of one of the objects 12(*a*) to 12(*c*) (Yes at S219), the object selection detecting unit 14 determines that the user selects the corresponding object and outputs an ID number of the object (for example, object 12(*b*)) to the object determining unit 15 (S221).

Upon receipt of the ID number of the object from the object selection detecting unit 14, assuming that the user determines the object corresponding to the ID number, the object determining unit 15 outputs the ID number to the object display control unit 13. Furthermore, the object determining unit 15 performs a determination process corresponding to the object as necessary.

Upon receipt of the ID number of the object from the object determining unit 15, the object display control unit 13 displays the object corresponding to the ID number, for example, presents determination of the object to the user by changing the size and color of the object (S223).

Next, the operations performed by the object determining unit 15 when the cursor 9 is on the display area of the object 12(*b*) as illustrated in FIG. 5 will be described as a specific example.

When the user pressed down the touch sensor 2 and turned ON the switch 3 to determine the object 12(*b*) selected by the user, the object determining unit 15 assumes that the user determines the object 12(*b*) corresponding to the ID number provided from the object selection detecting unit 14.

As a result, the object determining unit 15 outputs the ID number of the object 12(*b*) to the object display control unit 13, and performs the determination process corresponding to the object 12(*b*) (for example, when the object 12(*b*) is an icon of an application, the object determining unit 15 starts the application).

Upon receipt of the ID number of the object 12(*b*) from the object determining unit 15, the object display control unit 13 displays the object 12(*b*) on the GUI screen 7, for example, presents determination of the object 12(*b*) to the user by changing the size and color of the object.

Next, operations performed by the pressing start time estimating unit 20 according to Embodiment 1 will be described in detail.

First, the movement amount calculating unit 21 reads, from the touch information sequence storage unit 5, touch positions and the touch times for a predetermined period from a time previous to a pressing time included in the pressing information, and determines at least one of types of amounts of movement, such as a movement distance, a movement speed, and a movement acceleration of the user's finger.

For example, (x(t), y(t)) denotes a touch position at a certain time t.

Assuming that T denotes a pressing time at which the user pressed the clickable touch sensor 1 (time when the switch 3 was actually turned ON), the movement amount calculating unit 21 calculates "n" movement speeds v(t) (t=T−1, T−2, . . . , T−n) that are amounts of movement for a predetermined period using Equation 1 below.

[Math 1]

$$v(t)=\sqrt{(x(t)-x(t-1))^2+(y(t)-y(t-1))^2}$$ (Equation 1)

Next, the stop time detecting unit 22 determines a time at which the user's finger stopped on the touch sensor 2, using the amount of movement obtained by the movement amount calculating unit 21, such as a movement distance, a movement speed, and a movement acceleration.

Specifically, the stop time is a time at which the amount of movement of the finger reaches a predetermined value or smaller. For example, when a movement speed is used as an amount of movement and Vs denotes a threshold of the movement speed at which the finger estimated as being stopped, a first time "t" that satisfies v(t)≤Vs from among the "n" movement speeds v(t) for a predetermined period is a stop time Ts.

The stop time may be the following time:
a time at which an amount of movement of the finger reaches a predetermined value or smaller and at which a time shorter than or equal to the predetermined value exceeds a predetermined time;
a time at which at least two types of amounts of movement of the finger reaches a predetermined value or smaller; or
a time at which at least two types of amounts of movement of the finger reaches a predetermined value or smaller and at which a time shorter than or equal to the predetermined value exceeds a predetermined time.

Finally, the stop time detecting unit 22 outputs the obtained stop time Ts as a pressing start time to the touch position determining unit 23.

The operations performed by the pressing start time estimating unit 20 according to Embodiment 1 are described hereinbefore.

When the user pressed down the touch sensor 2 of the clickable touch sensor 1 and turned ON the switch 3 to determine the selected object, in the information input device according to Embodiment 1, the pressing start position estimating unit 16 can estimate a touch position of the user's finger when the user started to press the touch sensor 2, based on "n" touch positions that are stored in the touch information sequence storage unit 5 for a predetermined period immediately before the user pressed the switch 3.

In other words, the pressing start position estimating unit 16 uses the pressing start time that is an estimated time at which the user started to press the switch 3, instead of the position of the finger when the switch 3 is actually turned ON. Accordingly, it is possible to prevent the misclick on the clickable touch sensor 1.

Thus, even when the user's finger presses the switch 3 and the finger is slightly displaced by the pressure of the finger, the object selected by the user can be determined, and an erroneous operation caused by the misclick can be reduced.

Furthermore, a touch position changing operation can be performed by moving the finger on the touch sensor 2 unless the user completely presses down the switch 3 according to Embodiment 1. The method according to the present invention is different from a method for preventing the misclick by detecting an operation of the user who intends to press the switch 3 with pressure of the user's finger to the touch sensor 2 and invalidating the touch position changing operation, that is, a cursor movement operation on the GUI screen 7, as performed by the conventional information input device. In other words, even when the user moves the finger on the touch sensor 2 and somewhat strongly presses the touch sensor 2, the user can successively input touch positions, that is, continuously move the cursor 9 on the GUI screen 7. Thus, the operability according to Embodiment 1 in the present invention can be more improved than that of the conventional information input device.

Furthermore, although the conventional information input device needs the special touch sensor 101 that can detect the pressure of the user's finger, the pressing start position estimating unit 16 merely estimates a pressing start position based on the touch position stored in the touch information sequence storage unit 5 according to Embodiment 1. Thus, the touch sensor 2 that is generally used for detecting a position of a finger can also prevent the misclick.

Specifically, even when the user presses down the switch 3 and the finger is slightly displaced by the pressure of the finger, the information input device 200 according to Embodiment 1 can reliably input a position at which the user intended to press the switch 3 and reduce an erroneous operation caused by the misclick. Furthermore, the information input device 200 can perform the touch position changing operation by moving the finger on the touch sensor 2 unless the user completely presses down the switch 3 according to Embodiment 1. The method according to the present invention is different from the method for preventing the misclick by detecting an operation of the user who intended to press the switch 3 with pressure of the user's finger to the touch sensor 2 and invalidating the touch position changing operation according to the movement of the user's finger, as performed by the conventional information input device. Thus, even when the user moves the finger on the touch sensor 2 and somewhat strongly presses the touch sensor 2, the user can successively input touch positions. Thus, it is possible to provide the information input device with the misclick prevention function with which the operability has been more improved than that of the conventional technique.

Furthermore, the information input device 200 according to Embodiment 1 may be an information input device with a misclick prevention function using a general touch sensor that cannot output information corresponding to the pressure of the user's finger.

According to Embodiment 1, the pressing start time estimating unit 20 of the pressing start position estimating unit 16 may have a configuration illustrated in FIGS. 6 to 8 to be described hereinafter, instead of the configuration illustrated in FIG. 3.

(Modification 1)

Figure 6:
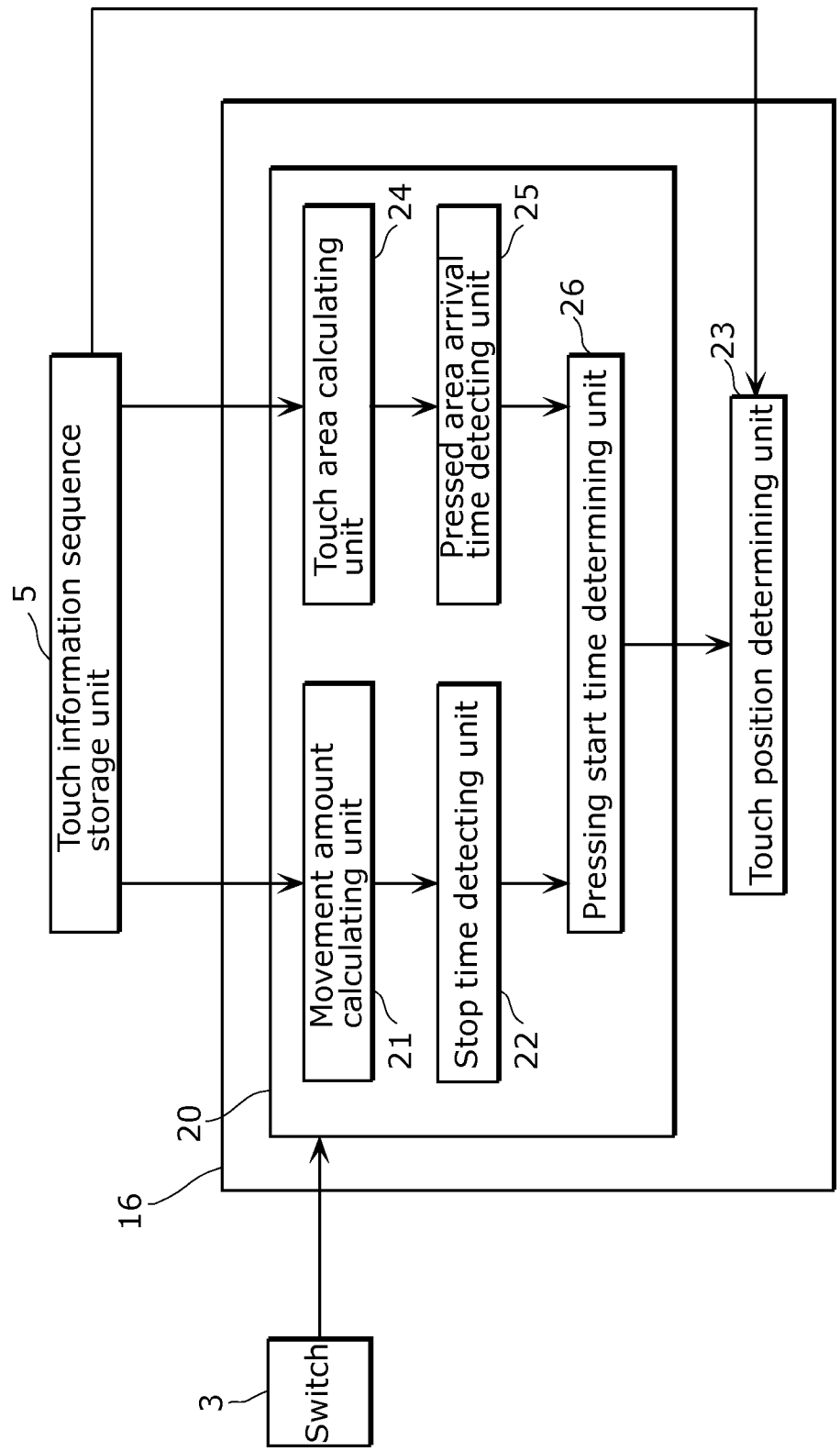
FIG. 6 is a block diagram illustrating a configuration of a pressing start position estimating unit according to Modification 1 of Embodiment 1.

FIG. 6 is a block diagram illustrating a configuration of the pressing start time estimating unit 20 according to Modification 1 of Embodiment 1. In FIG. 6, the same constituent elements as those in FIG. 3 according to Embodiment 1 are denoted by the same reference numerals, and the detailed description thereof is omitted.

As illustrated in FIG. 6, the pressing start time estimating unit 20 includes the movement amount calculating unit 21, the stop time detecting unit 22, a touch area calculating unit 24, a pressed area arrival time detecting unit 25, and a pressing start time determining unit 26.

Here, the pressing start time estimating unit 20 according to Modification 1 is different from that according to Embodiment 1 in including the touch area calculating unit 24, the pressed area arrival time detecting unit 25, and the pressing start time determining unit 26, which will be described hereinafter.

The touch area calculating unit 24 in FIG. 6 determines an area which the user's finger is in contact with, based on the touch information item stored in the touch information sequence storage unit 5.

The pressed area arrival time detecting unit 25 determines a time at which the user arrived at a pressed area that is a threshold of a touch area for determining that the user started to press the touch sensor 2. The touch area is obtained from the touch area calculating unit 24.

The pressing start time determining unit 26 determines the pressing start time at which the user started to press the touch sensor 2, using a first time that is a stop time Ts and is obtained from the stop time detecting unit 22, and a second time that is obtained from the pressed area arrival time detecting unit 25 and is a time at which the user arrived at the pressed area that is the threshold of the touch area for determining that the user started to press the touch sensor 2.

The operations performed by the pressing start time estimating unit 20 with the aforementioned configuration will be described.

As described above, when the switch 3 provides the pressing information with the clickable touch sensor 1 pressed, the movement amount calculating unit 21 obtains, from the touch information sequence storage unit 5, touch positions and the touch times for a predetermined period from a time previous to the pressing time of the pressing information.

Next, the movement amount calculating unit 21 determines at least one of types of amounts of movement, such as a movement distance, a movement speed, and a movement acceleration of the user's finger, using the touch positions and the touch times that are obtained.

Furthermore, the stop time detecting unit 22 determines the stop time Ts that is the first time at which the calculated amount of movement is smaller than or equal to a threshold.

Furthermore, the touch area calculating unit 24 reads, from the touch information sequence storage unit 5, capacitive values for the predetermined period from the time previous to the pressing time of the pressing information, and determines a touch area of the touch sensor 2 in contact with the user's finger. For example, assuming that T denotes a pressing time and c(t) denotes a capacitive value at a certain time "t", the touch area calculating unit 24 calculates "n" touch areas s(t) (t=T−1, T−2, . . . , T−n) using Equation 2 below.

[Math 2]

$$s(t) = \alpha \cdot c(t)^\beta + \gamma \qquad \text{(Equation 2)}$$

Next, the pressed area arrival time detecting unit 25 determines a time at which the user arrived at the pressed area indicating the touch area estimated as an area at which the user started to press the touch sensor 2 with the finger (not moving the finger), using the touch area estimated by the touch area calculating unit 24.

More specifically, the time at which the touch area is larger than or equal to a predetermined value is a pressed area arrival time.

For example, assuming that Sp denotes a threshold of the touch area that is an estimated area estimated when the user started to press the touch sensor 2 with the finger, Tp that is the first time "t" that satisfies s(t)≥Sp from among the "n" touch areas s(t) for the predetermined period is a pressed area arrival time. The pressed area arrival time may be determined when a touch area is larger than or equal to a predetermined value, and using a time at which the touch area continues for a predetermined period or longer.

Finally, the pressing start time determining unit 26 determines (estimates) the pressing start time at which the user started to press the touch sensor 2 with the finger, based on the stop time Ts obtained from the stop time detecting unit 22 and the pressed area arrival time Tp obtained from the pressed area arrival time detecting unit 25.

More specifically, the pressing start time determining unit 26 has only to select one of the stop time Ts and the pressed area arrival time Tp that is closer to the pressing time T that is a time when the switch 3 actually pressed, and determine the selected time as the pressing start time.

The pressing start time determining unit 26 may calculate an average between the stop time Ts and the pressed area arrival time Tp and determine the average as the pressing start time.

In the pressing start time estimating unit 20 according to Modification 1 with such a configuration, the pressing start time determining unit 26 can determine the pressing start time at which the user started to press the touch sensor 2 with the finger, using the time at which movement of the user's finger stopped that is estimated by the stop time detecting unit 22 and a time which is detected by the pressed area arrival time detecting unit 25 and at which the touch area of the user's finger in contact with the touch sensor 2 exceeds a predetermined pressed area.

Thus, after the user stopped the movement of the finger to turn ON the switch 3, the pressing start time estimating unit 20 can accurately detect an operation of pressing the touch sensor 2 with the fingertip to press the touch sensor 2, and calculate a pressing start time with higher accuracy than that in FIG. 3 according to Embodiment 1.

Thus, the pressing start time estimating unit 20 can accurately determine a touch position at which the user started to press the touch sensor 2 with the finger, and reduce an erroneous operation caused by the misclick with higher accuracy according to Modification 1 than that in FIG. 3 according to Embodiment 1.

The operations performed by the pressing start time estimating unit 20 according to Modification 1 of Embodiment 1 are described hereinbefore.

Next, Modification 2 of Embodiment 1 will be described.
(Modification 2)

Figure 7:
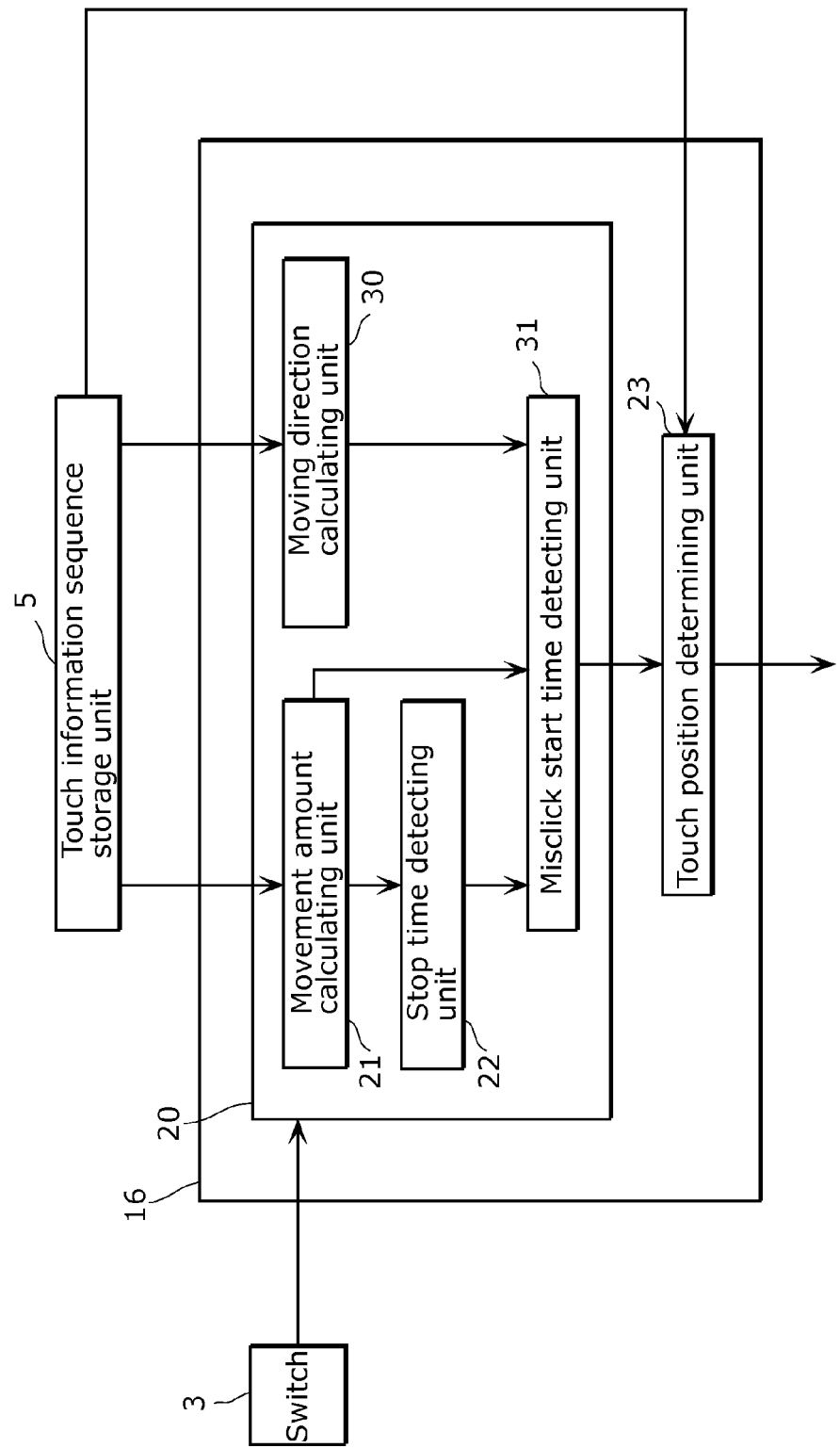
FIG. 7 is a block diagram illustrating a configuration of a pressing start position estimating unit according to Modification 2 of Embodiment 1.

FIG. 7 is a block diagram illustrating a configuration of the pressing start time estimating unit 16 according to Modification 2 of Embodiment 1. In FIG. 7, the same constituent elements as those in FIGS. 3 and 6 according to Embodiment 1 are denoted by the same reference numerals, and the detailed description thereof is omitted.

As illustrated in FIG. 7, the pressing start time estimating unit 20 according to Modification 2 includes the movement amount calculating unit 21, the stop time detecting unit 22, a moving direction calculating unit 30, and a misclick start time detecting unit 31.

The difference between FIG. 7 according to Modification 2 and FIG. 3 according to Embodiment 1 is that the pressing start time estimating unit 20 further includes the moving direction calculating unit 30 and the misclick start time detecting unit 31.

These constituent elements will be described hereinafter.

The moving direction calculating unit 30 calculates a moving direction of the user's finger on the touch sensor 2, based on the touch information item stored in the touch information sequence storage unit 5.

The misclick start time detecting unit 31 detects the presence or absence of misclick by the user's finger on the touch sensor 2, using at least one type of an amount of movement obtained from the movement amount calculating unit 21 (for example, movement speed or movement acceleration), the moving direction obtained from the moving direction calculating unit 30, and the stop time estimated as a time at which the user's finger estimated as being stopped on the touch sensor 2 and is obtained from the stop time detecting unit 22.

Furthermore, when detecting misclick, the misclick start time detecting unit 31 determines a time immediately previous to the time when the user misclicked, and outputs the time as the pressing start time when the user's finger started to touch the touch sensor 2.

The operations performed by the pressing start time estimating unit 20 with the aforementioned configuration will be described.

First, upon receipt of the pressing information with the switch 3 pressed as described above, the movement amount calculating unit 21 obtains, from the touch information sequence storage unit 5, the touch positions and the touch times for a predetermined period from a time previous to the pressing time of the pressing information.

Next, the movement amount calculating unit 21 determines one of types of amounts of movement, such as a movement distance, a movement speed, and a movement acceleration of the user's finger, using the touch positions and the touch times that are obtained.

Next, upon receipt of the amount of movement from the movement amount calculating unit 21, the stop time detecting unit 22 determines a time at which it is estimated that the user's finger stopped on the touch sensor 2, using the movement amount.

Specifically, the stop time is a time at which the amount of movement of the finger reaches a predetermined value or smaller. For example, when a movement speed is used as an amount of movement and Vs denotes a threshold of the movement speed at which the finger estimated as being stopped, a first time "t" that satisfies v(t)≤Vs from among the "n" movement speeds v(t) for a predetermined period is a stop time Ts.

Furthermore, the moving direction calculating unit 30 obtains, from the touch information sequence storage unit 5, the touch positions and the touch times for the predetermined period from a time previous to the pressing time of the pressing information.

Next, the moving direction calculating unit 30 determines a moving direction of the user's finger on the touch sensor 2, using the touch positions and the touch times that are obtained. For example, assuming that T denotes a pressing time and (x(t), y(t)) denotes a touch position at a certain time "t" using x and y coordinates, the moving direction calculating unit 30 calculates "n" moving directions θ(t) (t=T−1, T−2, . . . , T−n) for a predetermined period before T using Equation 3 below.

[Math 3]

$$\theta(t) = \cos^{-1}\left(\frac{P(t) \cdot P(t-1)}{\|P(t)\|\|P(t-1)\|}\right) \quad \text{(Equation 3)}$$

in the case where P(t)=(x(t)−x(t−1), y(t) y(t−1) is satisfied.

P(t)·P(t−1) expresses an inner product of vectors P(t) and P(t−1), and ‖P(t)‖ expresses a norm of the vector P(t).

Next, the misclick start time detecting unit 31 detects whether or not the user misclicked when the user pressed down the touch sensor 2 with the finger, using the amount of movement obtained from the movement amount calculating unit 21, the moving direction obtained from the moving direction calculating unit 30, and the stop time detected by the stop time detecting unit 22.

Specifically, the misclick start time detecting unit 31 estimates that the misclick has occurred when each of the amount of movement and the moving direction of the user's finger is larger than or equal to a predetermined value, during a period from the stop time Ts at which the user's finger is estimated as being stopped to the pressing time T at which the switch 3 was pressed down.

For example, assuming that a movement speed v(t) denotes an amount of movement of the user's finger (see Equation 1), θ(t) denotes a moving direction of the user's finger, Vb denotes a threshold of the movement speed at which the user's finger is estimated as having misclick, and Θb denotes a threshold of the moving direction in which the user's finger is estimated as having misclick, when v(t) and θ(t) satisfy a misclick condition as expressed by Expression 4 below during a period from the time Ts to the time (T−1), the misclick start time detecting unit 31 estimates that the user misclicked with the finger.

[Math 4]

$$v(t) > Vb \text{ and } \theta(t) > \Theta b \qquad \text{(Expression 4)}$$

The condition for detecting misclick may be a condition under which the misclick state continues for more than a predetermined period.

When detecting the misclick, the misclick start time detecting unit 31 determines a time Tb immediately previous to the detection of the misclick and outputs the time Tb as a pressing start time, where Ts<Tb<T−1. For example, the time Tb is a time the closest to Ts from among the times "t" that satisfy Expression 4.

In the pressing start time estimating unit 20 according to Modification 2, the misclick start time detecting unit 31 detects whether or not the user's finger was displaced (the user misclicked), using an amount of movement and a moving direction of the finger, and outputs a time immediately previous to the misclick as a pressing start time only when detecting the misclick.

In other words, the misclick start time detecting unit 31 according to Modification 2 determines, as misclick, abrupt change in an amount of movement and a moving direction of the user's finger after the user's finger is in a stop state, and detects, as a pressing start time, the time immediately previous to occurrence of the misclick.

Thus, even when it is difficult to accurately detect the stop state of the finger after the user started to press the touch sensor 2, since the amount of movement of the user's finger is relatively small, the misclick start time detecting unit 31 can determine the pressing start time with higher accuracy.

For example, when a larger number of objects are displayed on the GUI screen 7, the user needs to accurately select a target object among them. Here, the amount of movement of the user's finger on the touch sensor 2 is relatively small. Thus, it is very difficult to detect a time at which the movement of the finger stopped.

However, the configuration for detecting the abrupt change in a moving direction in addition to an amount of movement to estimate a stop time according to Modification 2 enables reduction in an erroneous operation caused by misclick.

Although the misclick start time detecting unit 31 detects misclick using both feature quantities of the amount of movement and the moving direction, it may detect the misclick using only one of the feature quantities.

The pressing start time estimating unit 20 according to Modification 2 does not necessarily have to include the stop time detecting unit 22. In such a case, for example, the misclick start time detecting unit 31 obtains the calculated amount of movement from the movement amount calculating unit 21, and determines whether or not the amount of movement is smaller than or equal to a threshold.

Modification 2 of Embodiment 1 is described hereinbefore.

Next, Modification 3 of Embodiment 1 will be described.

(Modification 3)

Figure 8:
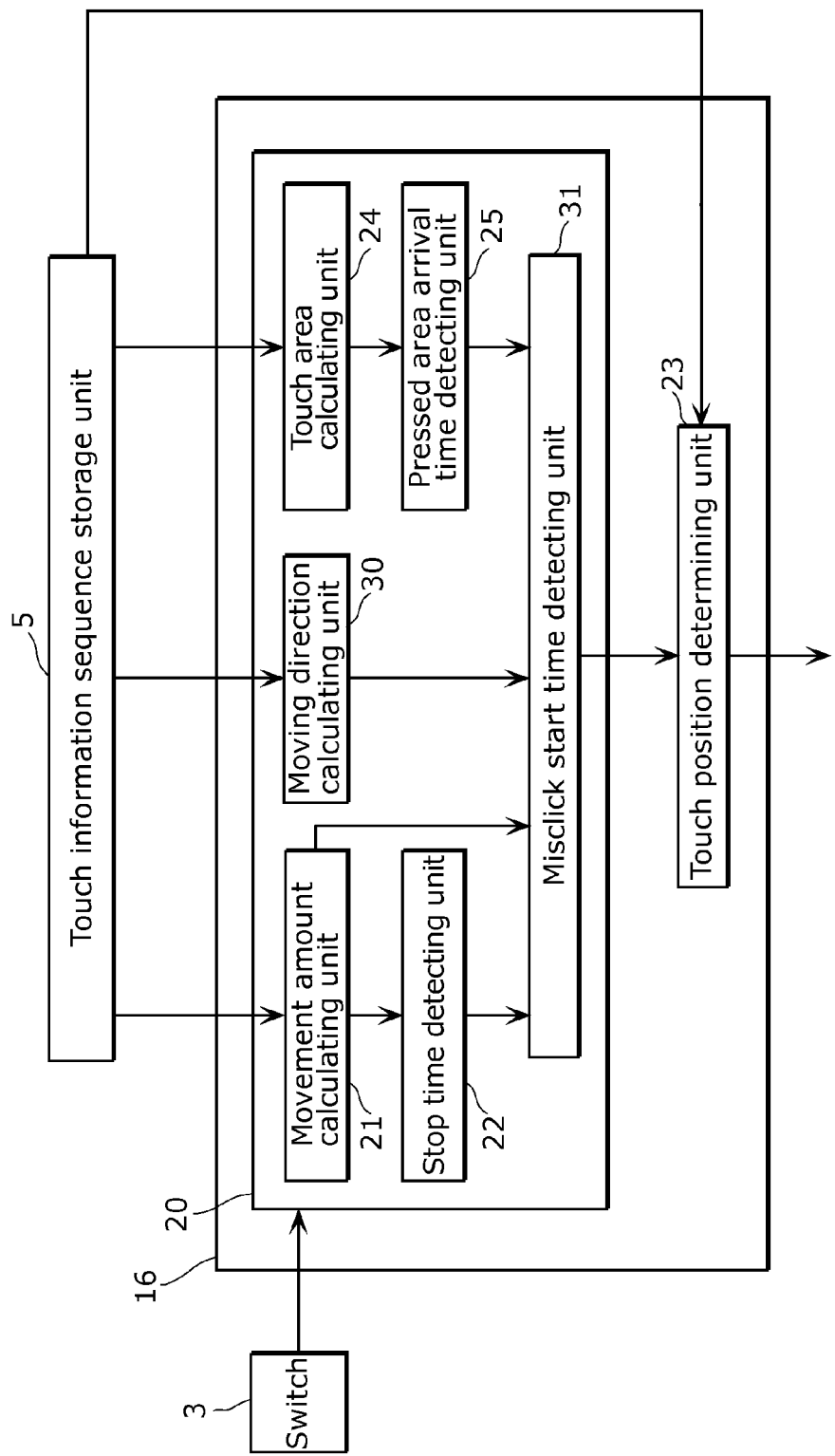
FIG. 8 is a block diagram illustrating a configuration of a pressing start position estimating unit according to Modification 3 of Embodiment 1.

FIG. 8 is a block diagram illustrating a configuration of the pressing start time estimating unit 20 according to Modification 3. In FIG. 8, the same constituent elements as those in FIGS. 3 to 7 according to Embodiment 1 are denoted by the same reference numerals, and the detailed description thereof is omitted.

As illustrated in FIG. 8, the pressing start time estimating unit 20 according to Modification 3 includes the movement amount calculating unit 21, the stop time detecting unit 22, the moving direction calculating unit 30, the touch area calculating unit 24, the pressed area arrival time detecting unit 25, and the misclick start time detecting unit 31.

The difference between FIG. 8 according to Modification 3 and FIG. 7 according to Modification 2 is that the pressing start time estimating unit 20 further includes the touch area calculating unit 24 and the pressed area arrival time detecting unit 25. Since the touch area calculating unit 24 and the pressed area arrival time detecting unit 25 have the same configuration as that in FIG. 6, the detailed description thereof is omitted and only the operations performed by the pressing start time estimating unit 20 with the configuration in FIG. 8 will be described.

As already described for the operations in FIG. 7 according to Modification 2, upon receipt of the pressing information from the switch 3, the movement amount calculating unit 21 obtains, from the touch information sequence storage unit 5, the touch positions and the touch times for a predetermined period from a time previous to the pressing time T of the pressing information.

Next, the movement amount calculating unit 21 determines at least one of types of amounts of movement, such as a movement distance, a movement speed, and a movement acceleration of the user's finger, using the touch positions and the touch times that are obtained.

Upon receipt of the amount of movement from the movement amount calculating unit 21, the stop time detecting unit 22 determines a time at which it is estimated that the user's finger stopped on the touch sensor 2, using the movement amount, and outputs the time as a stop time Ts.

Furthermore, the moving direction calculating unit 30 determines a moving direction of the user's finger on the touch sensor 2, using the touch positions and the touch times that are stored in the touch information sequence storage unit 5 for the predetermined period from the time previous to the pressing time T of the pressing information.

As already described for the operations in FIG. 6 according to Modification 1 of Embodiment 1, upon receipt of the pressing information from the switch 3, the touch area calculating unit 24 obtains, from the touch information sequence storage unit 5, capacitive values for the predetermined period from the time previous to the pressing time T of the pressing information.

Next, the touch area calculating unit 24 determines an area of the touch sensor 2 with which the user's finger is in contact, for each of the obtained times using the obtained capacitive values (see Equation 2).

Next, the pressed area arrival time detecting unit 25 determines a time at which the user arrived at the pressed area that is a threshold of a touch area for determining that the user started to press the touch sensor 2, using the touch area calculated by the touch area calculating unit 24, and outputs the time as the pressed area arrival time Tp.

Finally, the misclick start time detecting unit 31 compares the stop time Ts obtained from the stop time detecting unit 22 with the pressed area arrival time Tp obtained from the pressed area arrival time detecting unit 25, and detects a time closer to the pressing time T of the switch 3, as a misclick monitoring start time Tw.

Next, the misclick start time detecting unit 31 detects whether or not the misclick has occurred when the user presses the touch sensor 2 with the finger, using the amount of movement obtained from the movement amount calculating unit 21 and the moving direction obtained from the moving direction calculating unit 30.

Specifically, the misclick start time detecting unit 31 estimates that the misclick has occurred when each of the amount of movement and the moving direction of the user's finger is larger than or equal to a predetermined value, during a period from the misclick monitoring start time Tw to the pressing time T at which the switch 3 was pressed.

For example, assuming that a movement speed v(t) denotes an amount of movement of the user's finger (see Equation 1), θ(t) denotes a moving direction of the user's finger, Vb denotes a threshold of the movement speed at which the user's finger was estimated as having the misclick, and Θb denotes a threshold of the moving direction in which the user's finger was estimated as having the misclick, when v(t) and θ(t) satisfy a misclick condition as expressed by Expression 5 below during a period from the time Tw to the time (T−1), the misclick start time detecting unit 31 estimates that the user misclicked with the finger.

[Math 5]

$$v(t) > Vb \text{ and } \theta(t) > \Theta b \quad \text{(Expression 5)}$$

The condition for detecting misclick may be a condition under which the misclick state continues for more than a predetermined period.

When detecting the misclick, the misclick start time detecting unit 31 determines a time Tb immediately previous to the detection of the misclick, and outputs the time Tb as a pressing start time, where Tw<Tb<T−1.

For example, the time Tb is a time the closest to Tw from among the times "t" that satisfy Expression 5.

As described above, the misclick start time detecting unit 31 according to Modification 3 detects whether or not the user's finger misclicked on the touch sensor 2, using an amount of movement and a moving direction of the user's finger, and outputs a time immediately previous to detection of the misclick as a pressing start time only when detecting the misclick.

Furthermore, the misclick start time detecting unit 31 according to Modification 3 detects misclick using an amount of movement and a moving direction of the user's finger, during a period from the time Tw to the time T. The time Tw is larger one of the stop time Ts at which movement of the finger stopped and the time Tp at which the touch area of the user's finger on the touch sensor 2 exceeds a predetermined pressed area.

Thus, according to Modification 3, it is possible to more accurately detect a time at which the user stopped moving the finger to turn ON the switch 3 and presses down the touch sensor 2 with the fingertip, and calculate a pressing start time with higher accuracy by narrowing down a possible period at which the misclick may occur. Furthermore, it is possible to reduce the workload for detecting the misclick.

Thus, it is possible to accurately determine a touch position at which the user started to press the touch sensor 2, reduce an erroneous operation caused by the misclick, and accelerate the processing for preventing the misclick.

Modification 3 of Embodiment 1 is described herein before.

As described above according to Embodiment 1 and Modifications 1 to 3, the information input device 200 in FIG. 2 does not have to include the cursor position calculating unit 8, the cursor display control unit 10, the object placement storage unit 11, the object display control unit 13, the object selection detecting unit 14, and the object determining unit 15.

When the information input device 200 does not include the cursor position calculating unit 8, the cursor display control unit 10, the object placement storage unit 11, the object display control unit 13, the object selection detecting unit 14, and the object determining unit 15, the screen control unit 400 may include the cursor position calculating unit 8, the cursor display control unit 10, the object placement storage unit 11, the object display control unit 13, the object selection detecting unit 14, and the object determining unit 15.

In this case, the information input device 200 transmits, to the cursor position calculating unit 8 included in the screen control unit 400, at least one touch position stored in the touch information sequence storage unit 5, via a wired or wireless line. Furthermore, the information input device 200 transmits the pressing information when the switch 3 is turned ON, to the cursor position calculating unit 8 and the object selection detecting unit 14 that are included in the screen control unit 400. Furthermore, when the switch 3 is turned ON, the information input device 200 transmits a pressing start estimated position estimated by the pressing start position estimating unit 16, to the cursor position calculating unit 8 included in the screen control unit 400.

Even when the information input device 200 does not include the cursor position calculating unit 8 and the cursor display control unit 10, with the configuration, the cursor position calculating unit 8 can calculate a position of the cursor to be displayed on the GUI display 7, and the cursor display control unit 10 can display the cursor at the calculated position on the GUI display 7.

Even when the information input device 200 does not include the object placement storage unit 11, the object display control unit 13, and the object selection detecting unit 14, the object selection detecting unit 14 can detect an object selected by the user, based on the position of the cursor output from the cursor position calculating unit 8 and the object placement information stored in the object placement storage unit 11, and the object display control unit 13 can display the selection of the object by obtaining an ID number of the selected object obtained from the object selection detecting unit 14.

Furthermore, even when the information input device 200 does not include the object determining unit 15, upon turning ON the switch 3, the object selection detecting unit 14 receives the pressing information from the switch 3, and outputs the ID number of the object selected at that time. Thus, the object determining unit 15 can determine (execute) the object.

Embodiment 1 and Modifications 1 to 3 regarding the information input device 200 including the pressing start position estimating unit that estimates a pressing start position at which the user turned ON the switch 3 are described hereinbefore.

Next, Embodiment 2 that further describes a misclick correction control unit that determines whether or not a pressing start position should be estimated will be described.

Embodiment 2

Figure 9:
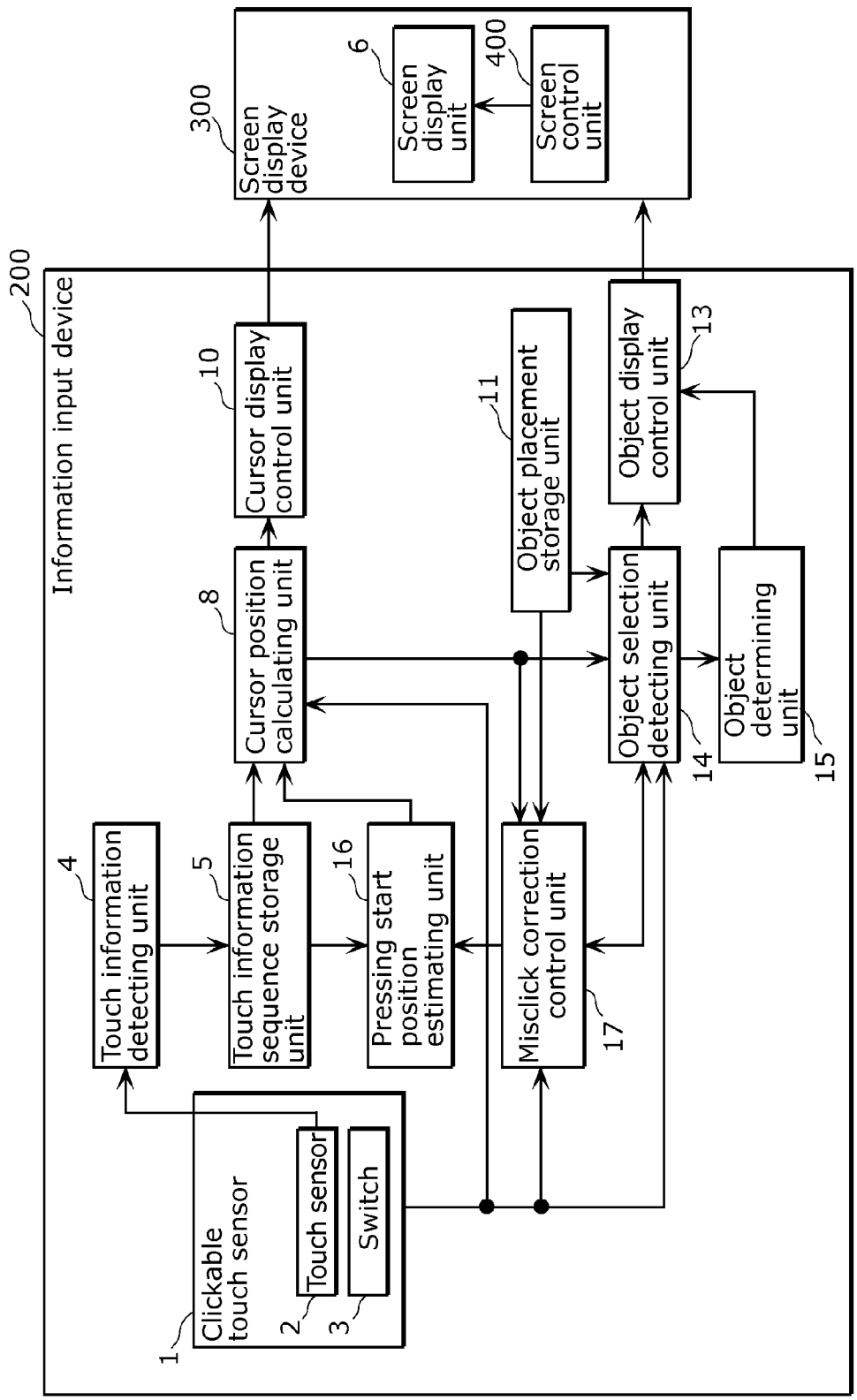
FIG. 9 is a block diagram illustrating a configuration of an information input device according to Embodiment 2 in the present invention.

FIG. 9 is a block diagram of an information input device according to Embodiment 2 in the present invention. In FIG. 9, the same constituent elements as those in FIG. 2 according to Embodiment 1 are denoted by the same reference numerals, and the detailed description thereof is omitted.

As illustrated in FIG. 9, the information input device 200 according to Embodiment 2 includes a clickable touch sensor 1, a touch information detecting unit 4, a touch information sequence storage unit 5, a pressing start position estimating unit 16, a misclick correction control unit 17, a cursor position calculating unit 8, a cursor display control unit 10, an object placement storage unit 11, an object display control unit 13, an object selection detecting unit 14, and an object determining unit 15.

FIG. 9 according to Embodiment 2 is different from FIG. 2 according to Embodiment 1 by including the misclick correction control unit 17. The misclick correction control unit 17 will be described hereinafter.

The misclick correction control unit 17 determines, on the GUI display 7, whether or not misclick correction is to be performed based on the object placement information detected by the object selection detecting unit 14 and the position of the cursor 9 obtained from the cursor position calculating unit 8, and causes the pressing start position estimating unit 16 to estimate a pressing start position when determining to perform the misclick correction.

Next, a method for determining whether or not the misclick correction control unit 17 performs the misclick correction will be described.

The misclick correction control unit 17 determines whether or not to perform the misclick correction, based on whether or not it is highly possible that the object detected by the object selection detecting unit 14 based on the position of the cursor before the correction is identical to the object detected by the object selection detecting unit 14 based on the position of the cursor corrected by the pressing start position estimating unit 16.

In other words, the misclick correction control unit 17 determines not to perform the misclick correction when it is highly possible that these objects are identical to each other, and otherwise, determines to perform the misclick correction.

Specifically, the misclick correction control unit 17 has only to define the maximum displacement width of the position of the cursor subject to misclick of the user's finger, and, even when the objects to be selected before and after correcting the current cursor position by the maximum displacement width are identical to each other, determine not to perform the misclick correction.

Figure 11:
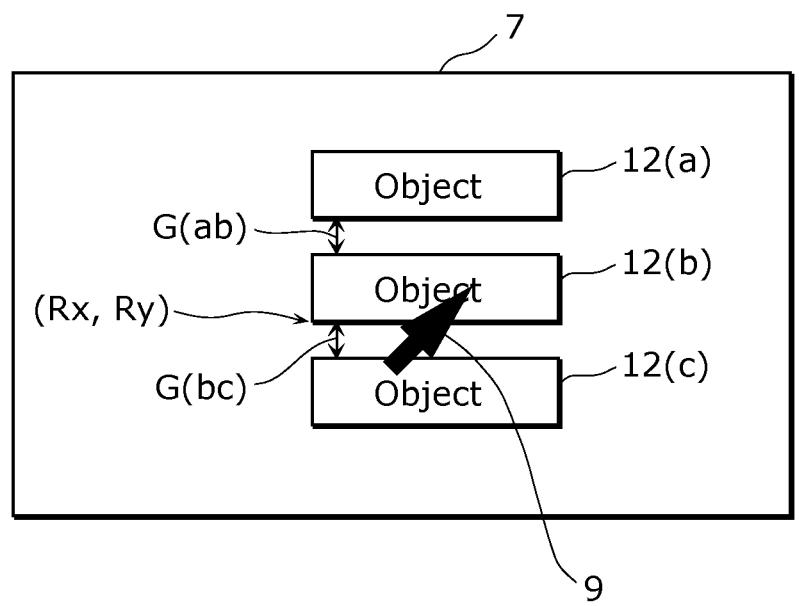
FIG. 11 illustrates an external view of a GUI screen according to Modification of Embodiment 2.

The processes will be more specifically described with reference to FIG. 11. As illustrated in FIG. 11, assume that on the GUI screen 7, (X, Y) denotes the current cursor position, and (Rx, Ry, W, H) denotes placement information of the selected object 12(b), where (Rx, Ry) denotes the lower left coordinate position of the object 12(b), and W and H denote a width and a height of the object 12(b), respectively. Furthermore, B denotes the maximum displacement width of the user's finger.

Here, when the cursor position (X, Y) before the correction satisfies the following Expression 6, the misclick correction control unit 17 determines not to perform the misclick correction.

[Math 6]

$$(Rx < X - B), (X + B < Rx + W), (Ry < Y - B), \text{ and } (Y + B < Ry + H).$$ (Expression 6)

Here, the maximum displacement widths B for vertical and horizontal misclick are not set to a fixed value, and may be set to different values.

Figure 10:
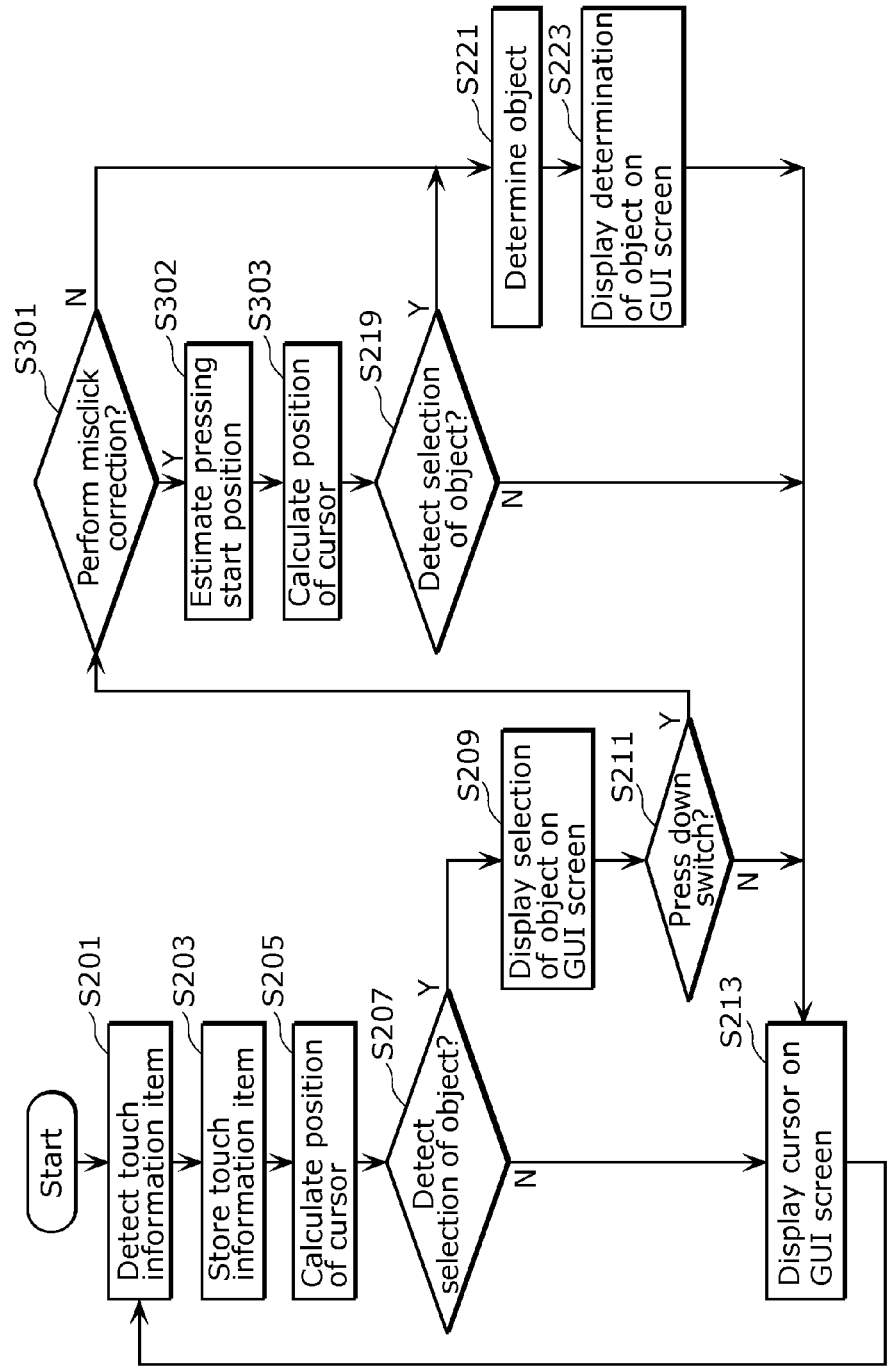
FIG. 10 is a flowchart of processes performed by the information input device according to Embodiment 2.

The procedure of the operations according to Embodiment 2 will be described with reference to FIG. 10.

Here, a series of operations in which the user selects and determines (executes), using the clickable touch sensor 1, the target object 12(b) from among the objects 12(a) to 12(c) placed on the GUI screen 7 displayed by the screen display unit 6 will be described as a specific example (see FIG. 11).

As already described, the configuration according to Embodiment 2 is a configuration in which the misclick correction control unit 17 is added to the configuration in FIG. 2 according to Embodiment 1. Each of the constituent elements in FIG. 9 other than the misclick correction control unit 17 performs the same processing as that according to Embodiment 1.

Specifically, the operations performed by the constituent elements until the user selects the target object 12(b) are identical to those according to Embodiment 1, in the series of operations in which the user selects and determines (executes), using the clickable touch sensor 1, the target object 12(b) from among the objects 12(a) to 12(c) placed on the GUI screen 7 displayed by the screen display unit 6.

Here, the operations after pressing down the touch sensor 2 of the clickable touch sensor 1 and turning ON the switch 3 (Yes at S211) in order to determine the object 12(b) selected by the user on the GUI screen 7 will be described.

When the user pressed down the clickable touch sensor 1 to turn ON the switch 3 (Yes at S211), the switch 3 outputs the pressing information to the misclick correction control unit 17, the cursor position calculating unit 8, and the object selection detecting unit 14.

Upon receipt of the pressing information from the switch 3, the misclick correction control unit 17 obtains an ID number of the object currently selected by the user (that is, overlapped by the cursor 9) (for example, object 12(b)) from the object selection detecting unit 14.

Furthermore, the misclick correction control unit 17 reads the position of the object 12(b) from the object placement storage unit 11 using the ID number obtained from the object selection detecting unit 14.

Furthermore, the misclick correction control unit 17 obtains, from the cursor position calculating unit 8, the current position of the cursor 9 on the GUI screen 7, at the time when the misclick correction control unit 17 obtains the pressing information.

Then, the misclick correction control unit 17 determines whether or not to perform the misclick correction, using the object placement information and the cursor position of the object 12(b) currently selected by the user (S301).

When determining to perform the misclick correction (Yes at S301), the misclick correction control unit 17 outputs misclick correction start information to the pressing start position estimating unit 16 and causes the pressing start position estimating unit 16 to perform the misclick correction.

Upon receipt of the misclick correction start information, the pressing start position estimating unit 16 estimates a pressing start position at which the user started to press the touch sensor 2 with the finger, based on the touch information item stored in the touch information sequence storage unit 5, and outputs the pressing start position to the cursor position calculating unit 8 (S302).

Then, the cursor position calculating unit 8 that obtains the pressing start position calculates the position of the cursor (S303).

Since the operations until the object determining unit determines an object are identical to those according to Embodiment 1, the description thereof is omitted herein.

When determining not to perform the misclick correction (No at S301), the misclick correction control unit 17 outputs misclick stop information to the object selection detecting unit 14.

Upon receipt of the misclick stop information, the object selection detecting unit 14 outputs the ID number of the selected object to the object determining unit 15.

Specifically, upon receipt of the pressing information from the switch 3 and the misclick stop information from the misclick correction control unit 17, the object selection detecting unit 14 outputs the ID number of the object 12(b) currently selected, to the object determining unit 15.

Since the operation of the object determining unit 15 (S221) and the operation of the object display control unit 13 (S223) are identical to those according to Embodiment 1, the description thereof is omitted herein.

According to Embodiment 2, the misclick correction control unit 17 determines whether or not it is highly possible that objects selected before and after performing the misclick correction for changing the cursor position are identical to each other, using the current cursor position on the GUI screen 7 and the object placement information of the object currently selected by the user (that is, overlapped by the cursor 9).

As a result, when it is highly possible that the objects are identical to each other, the information input device 200 does not perform the misclick correction.

In other words, as FIG. 2 according to Embodiment 1, when the user turned ON the switch 3, the pressing start position estimating unit 16 does not always perform the misclick correction, and instead, performs it only when it is highly possible that the user cannot determine a target object because of the misclick, that is, it is highly possible that an erroneous operation is performed, according to Embodiment 2.

Thus, Embodiment 2 can improve a response speed of a whole input operation more than that according to Embodiment 1. In particular, when the size of an object on the GUI screen 7 is sufficiently larger than the maximum displacement width caused by the misclick, it is less likely that the erroneous operation is performed. Thus, the response speed of a whole input operation can be more improved than that according to Embodiment 1.

The misclick correction control unit 17 according to Embodiment 2 may determine whether or not misclick correction is to be performed, based on not only the object placement information of the object detected by the object selection detecting unit 14 and the position of the cursor 9 obtained from the cursor position calculating unit 8, but also the first object detected by the object selection detecting unit 14 and at least one second object closer to the first object.

Next, Modification according to Embodiment 2 will describe the misclick correction control unit 17 that determines whether or not misclick correction is to be performed using the object placement information of the object closer to the detected object, with reference to FIG. 11.

(Modification of Embodiment 2)

FIG. 11 illustrates the GUI screen 7 according to Modification.

As illustrated in FIG. 11, the object 12(b) is detected by the object selection detecting unit 14, and the objects 12(a) and 12(c) are closer to the object 12(b).

Here, the misclick correction control unit 17 reads the object placement information of each of the objects 12(a) to 12(c) from the object placement storage unit 11, and determines gaps G(ab) and G(bc) in layout between the objects 12(a) and 12(b) and between the objects 12(b) and 12(c). Here, the object 12(b) is overlapped by the cursor 9 and is detected by the object selection detecting unit 14.

As described above, the misclick correction control unit 17 determines whether or not the misclick correction is to be performed using Expression 6. Here, the misclick correction control unit 17 changes the maximum displacement width B of the position of the cursor subject to the misclick by the user's finger, according to the gaps G(ab) and G(bc) in layout, not according to a predetermined fixed value.

Specifically, the misclick correction control unit 17 compares each of the gaps G(ab) and G(bc) with predetermined two thresholds Gs and Gb, where Gs<Gb.

In other words, when the gaps G(ab) and G(bc) are smaller than the threshold Gs, an erroneous operation caused by misclick is more frequently performed. Thus, the misclick correction control unit 17 sets the maximum displacement width B to be smaller by a predetermined value than the normal case. As a result, the misclick correction control unit 17 determines to perform the misclick correction more frequently.

Furthermore, when the gaps G(ab) and G(bc) are larger than the threshold Gb, an erroneous operation caused by misclick is less frequently performed. Thus, the misclick correction control unit 17 sets the maximum displacement width B to be larger by a predetermined value than the normal case. As a result, the misclick correction control unit 17 determines to perform the misclick correction less frequently.

As such, the misclick correction control unit 17 dynamically changes the threshold for determining whether or not the misclick correction is to be performed, based on a placement relationship between an object selected by the user and an object closer to the selected object in addition to the current cursor position and the object placement information of the selected object on the GUI screen 7. Thus, the information input device with a superior response speed and less erroneous operation caused by the misclick can be provided.

The information input device 200 including the misclick correction control unit 17 according to Embodiment 2 and Modification are described hereinbefore.

The information input device 200 prevents the misclick by estimating a pressing start position by the user (position of the finger on the touch sensor 2 at which the user probably started to press the clickable touch sensor 1).

Next, an information input device 200 including an object lock control unit 18 according to Embodiment 3 in the present invention will be described. The object lock control unit 18 prevents the user from selecting an object other than the object detected by the object selection detecting unit 14.

Embodiment 3

Figure 12:
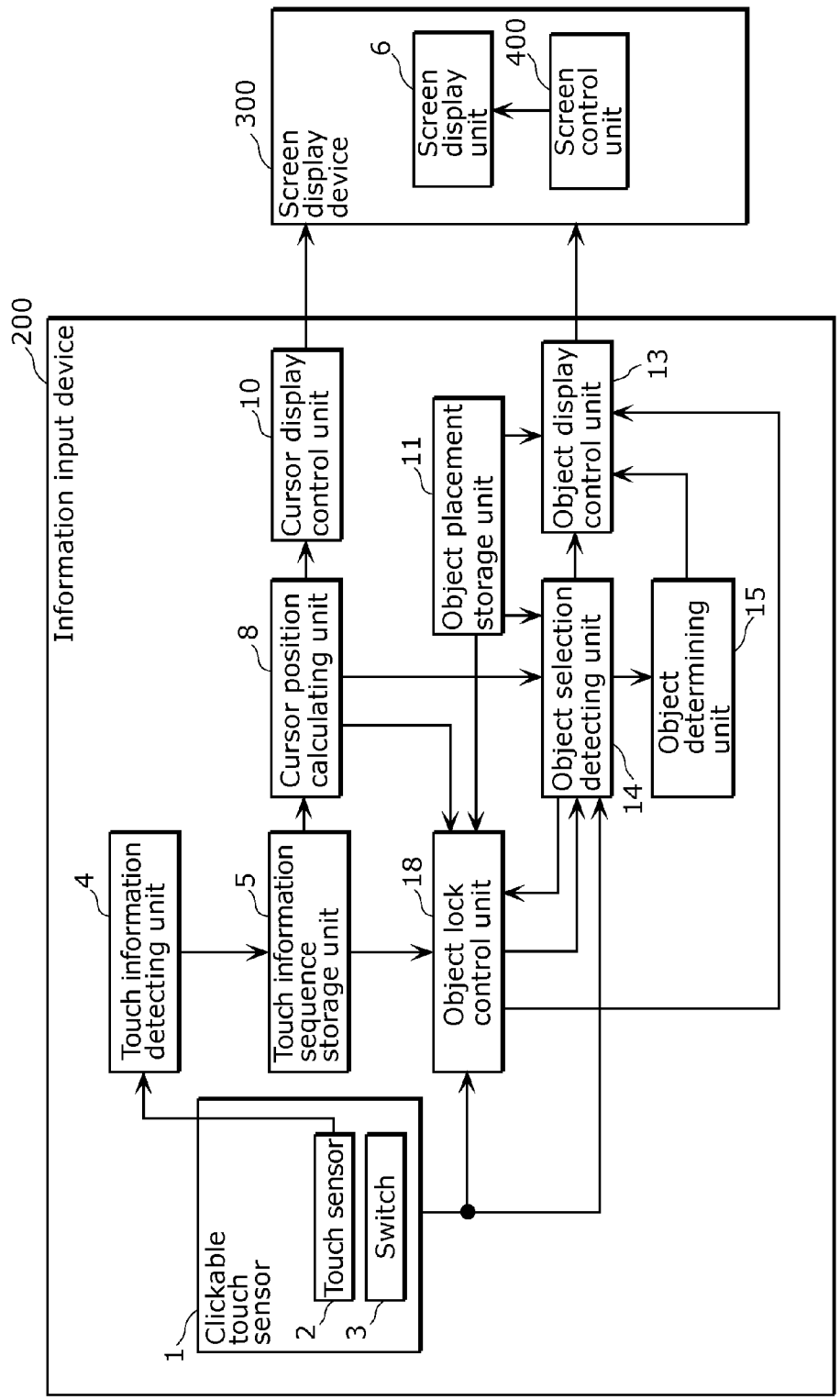
FIG. 12 is a block diagram of an information input device according to Embodiment 3 in the present invention.

FIG. 12 is a block diagram of the information input device 200 according to Embodiment 3 in the present invention. In FIG. 12, the same constituent elements as those in FIG. 2 according to Embodiment 1 are denoted by the same reference numerals, and the detailed description thereof is omitted.

As illustrated in FIG. 12, the information input device 200 according to Embodiment 3 includes a clickable touch sensor 1, a touch information detecting unit 4, a touch information sequence storage unit 5, a cursor position calculating unit 8, a cursor display control unit 10, an object placement storage unit 11, an object display control unit 13, an object selection detecting unit 14, an object determining unit 15, and the object lock control unit 18.

The difference between FIG. 12 according to Embodiment 3 and FIG. 2 according to Embodiment 1 is by including the object lock control unit 18 instead of the pressing start position estimating unit 16. The object lock control unit 18 will be described hereinafter.

The object lock control unit 18 determines whether or not to prevent the user from selecting an object other than the object detected by the object selection detecting unit 14, based on the touch information item stored in the touch information sequence storage unit 5.

According to Embodiment 3, a process of preventing the user from selecting an object other than the object detected by the object selection detecting unit 14 even when the user's finger moves on the touch sensor 2 is called a process of locking the object (object locking process).

Figure 13:
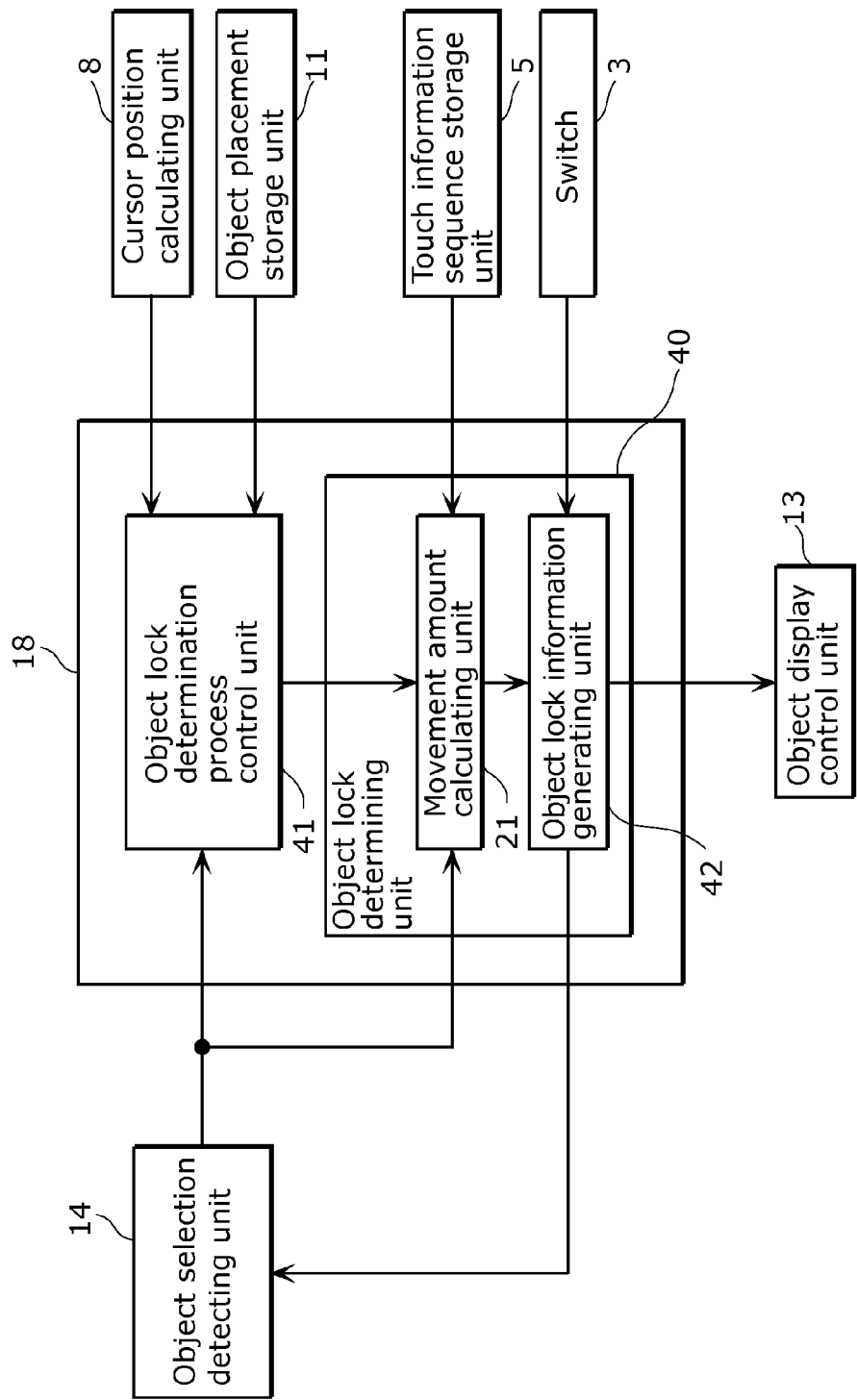
FIG. 13 is a block diagram illustrating a configuration of an object lock control unit according to Embodiment 3.

FIG. 13 is a block diagram specific to the object lock control unit 18 according to Embodiment 3.

As illustrated in FIG. 13, the object lock control unit 18 includes an object lock determining unit 40 and an object lock determination process control unit 41.

The object lock determining unit 40 determines whether or not to prevent the user from selecting an object other than the object detected by the object selection detecting unit 14, based on the touch information item stored in the touch information sequence storage unit 5.

The object lock determination process control unit 41 determines whether or not to perform an object lock determination process, based on the object placement information of the object detected by the object selection detecting unit 14 and the position of the cursor obtained from the cursor position calculating unit 8.

Furthermore, the object lock determining unit 40 includes a movement amount calculating unit 21 and an object lock information generating unit 42.

The movement amount calculating unit 21 is identical to that included in the pressing start time estimating unit 20 according to Embodiment 1.

The object lock information generating unit 42 determines whether or not to prevent the user from selecting an object other than the object detected by the object selection detecting unit 14 based on at least an amount of movement obtained from the movement amount calculating unit 21, and generates the object lock information according to a result of the determination.

Specifically, the object lock information is object lock start information for notifying the object selection detecting unit 14 and the object display control unit 13 of starting to lock an object, and is object lock stop information for notifying the object selection detecting unit 14 and the object display control unit 13 of releasing locking of the object.

Figure 14:
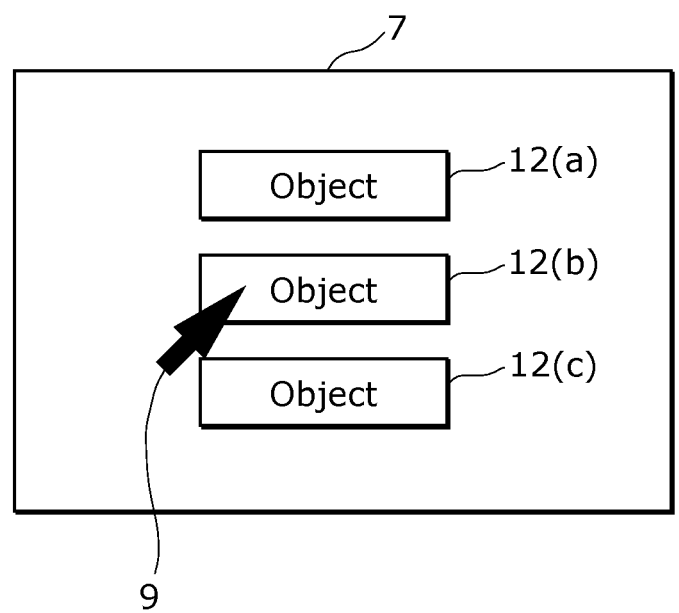
FIG. 14 illustrates an external view of a GUI screen according to Embodiment 3.

FIG. 14 illustrates an external view of a GUI screen according to Embodiment 3.

The specific operations performed by the object lock control unit 18 will be described with reference to FIGS. 13 and 14.

First, upon receipt of an ID number of the object 12(b) currently selected by the user from the object selection detecting unit 14, the object lock determination process control unit 41 obtains the object placement information of the object 12(b) on the GUI screen 7, from the object placement storage unit 11.

Furthermore, the object lock determination process control unit 41 obtains the current position of the cursor 9 on the GUI screen 7, from the cursor position calculating unit 8.

Then, the object lock determination process control unit 41 determines whether or not to cause the object lock determining unit 40 to perform an object lock determination process, using the object placement information of the object 12(b) and the position of the cursor 9.

Here, a method for determining whether or not the object lock determination process control unit 41 performs the object lock determination process will be described.

Even when the cursor position moves due to the misclick in pressing the touch sensor 2 with the user's finger, the object lock determination process control unit 41 determines whether or not to perform the object lock determination process, based on whether or not it is highly possible that the object detected by the object selection detecting unit 14 based on the position of the cursor before the movement by the misclick is identical to the object detected by the same based on the position of the cursor after the movement by the misclick.

In other words, the object lock determination process control unit 41 determines not to perform the object lock determination process when it is highly possible that the objects before and after the misclick are identical to each other, and otherwise, determines to perform the object lock determination process.

More specifically, the object lock determination process control unit 41 has only to define the maximum displacement width of the position of the cursor subject to misclick of the user's finger, and, even when the objects to be selected before and after moving the current cursor position by the maximum displacement width are identical to each other, determine not to perform the object lock determination process.

In other words, assume that on the GUI screen 7, (X, Y) denotes the current cursor position, (Rx, Ry, W, H) denotes the object placement information of the selected object 12(b) where Rx and Ry denote the lower left coordinate position of the object 12(b), and W and H denote the width and height of the object 12(b), respectively, and B denotes the maximum displacement width of the user's finger. In the case where the cursor position (X, Y) satisfies the following Expression 7, the object lock determination process control unit 41 determines not to perform the object lock determination process.

[Math 7]

$$(Rx < X-B), (X+B < Rx+W), (Ry < Y-B), \text{ and } (Y+B < Ry-H) \quad \text{(Expression 7)}$$

Here, the maximum displacement widths B for vertical and horizontal misclick are not set to a fixed value, and may be set to different values.

The method for determining whether or not the object lock determination process control unit 41 performs the object lock determination process is described hereinbefore.

When the object lock determination process control unit 41 determines to perform the object lock determination process, the object lock determining unit 40 determines whether or not to lock the object 12(b).

Thus, the operations performed by the object lock determining unit 40 will be described in detail next.

First, the movement amount calculating unit 21 obtains, from the touch information sequence storage unit 5, at least one touch information item for a predetermined period from the time previous to the time at which the object selection detecting unit 14 provides the ID number of the object.

Next, the movement amount calculating unit 21 determines at least one of types of amounts of movement, such as a movement distance, a movement speed, and a movement acceleration of the user's finger, using the touch positions and the touch times that are included in the obtained touch information item.

Next, the object lock information generating unit 42 determines, using the amount of movement calculated by the movement amount calculating unit 21 (at least one of the movement distance, the movement speed, and the movement acceleration), whether or not the user's finger is in a stop state, that is, the cursor 9 stopped on the object 12(b) in the GUI screen 7.

When the object lock information generating unit 42 determines that the user's finger is in the stop state and the object 12(*b*) detected by the object selection detecting unit 14 is not locked, the object lock information generating unit 42 estimates that the user pressed the touch sensor 2 with the finger to determine the object 12(*b*).

As a result, the object lock information generating unit 42 outputs the object lock start information to the object selection detecting unit 14.

Conversely, when the object lock information generating unit 42 determines that the user's finger is not in the stop state and the object 12(*b*) detected by the object selection detecting unit 14 is locked, the object lock information generating unit 42 estimates that the user moved the finger on the touch sensor 2 for selecting the other objects, and outputs the object lock stop information to the object selection detecting unit 14.

The cases where it is determined that the user's finger is not in the stop state include not only the case where the user's finger moved on the touch sensor 2 but also the case where the user's finger was detached from the touch sensor 2.

Furthermore, when the user turned ON the switch 3 (that is, determined the object 12(*b*)), the object lock information generating unit 42 outputs the object lock stop information to the object selection detecting unit 14.

As such, the locked object is released when the user moves the finger on the touch sensor 2, detaches the finger from the touch sensor 2, or turns ON the switch 3.

Next, assuming the amount of movement calculated by the movement amount calculating unit 21 as the movement speed, the operations performed by the object lock information generating unit 42 will be described more specifically.

Assuming that T denotes a time at which the object selection detecting unit 14 provides the ID number of the object 12(*b*) to the movement amount calculating unit 21 and (x(t), y(t)) denotes a touch position at a certain time t using X and Y coordinates, the movement amount calculating unit 21 calculates, using Equation 8, a movement speed v(t) (t=T−1, T−2, . . . , T−n) of the finger on "n" clickable touch sensors 1 for a predetermined period before the time T.

[Math 8]

$$v(t) = \sqrt{(x(t)-x(t-1))^2 + (y(t)-y(t-1))^2}$$ (Equation 8)

The object lock information generating unit 42 determines that the user's finger is in the stop state on the touch sensor 2, when the movement speed v(t) is continuously lower than or equal to a predetermined value for a predetermined period n'.

More specifically, assuming that Vs denotes a threshold of the movement speed v(t) at which the finger stopped, the object lock information generating unit 42 determines that the user's finger is in the stop state when t that satisfies v(t)≤Vs from among the "n" movement speeds v(t) calculated by Equation 8 continues for the predetermined period n'.

When at least two types of amounts of movement of the finger are smaller than or equal to a predetermined value for a fixed period, the object lock information generating unit 42 may determine that the finger is in the stop state, as the other methods for determining the stop state of the finger.

Figure 15:
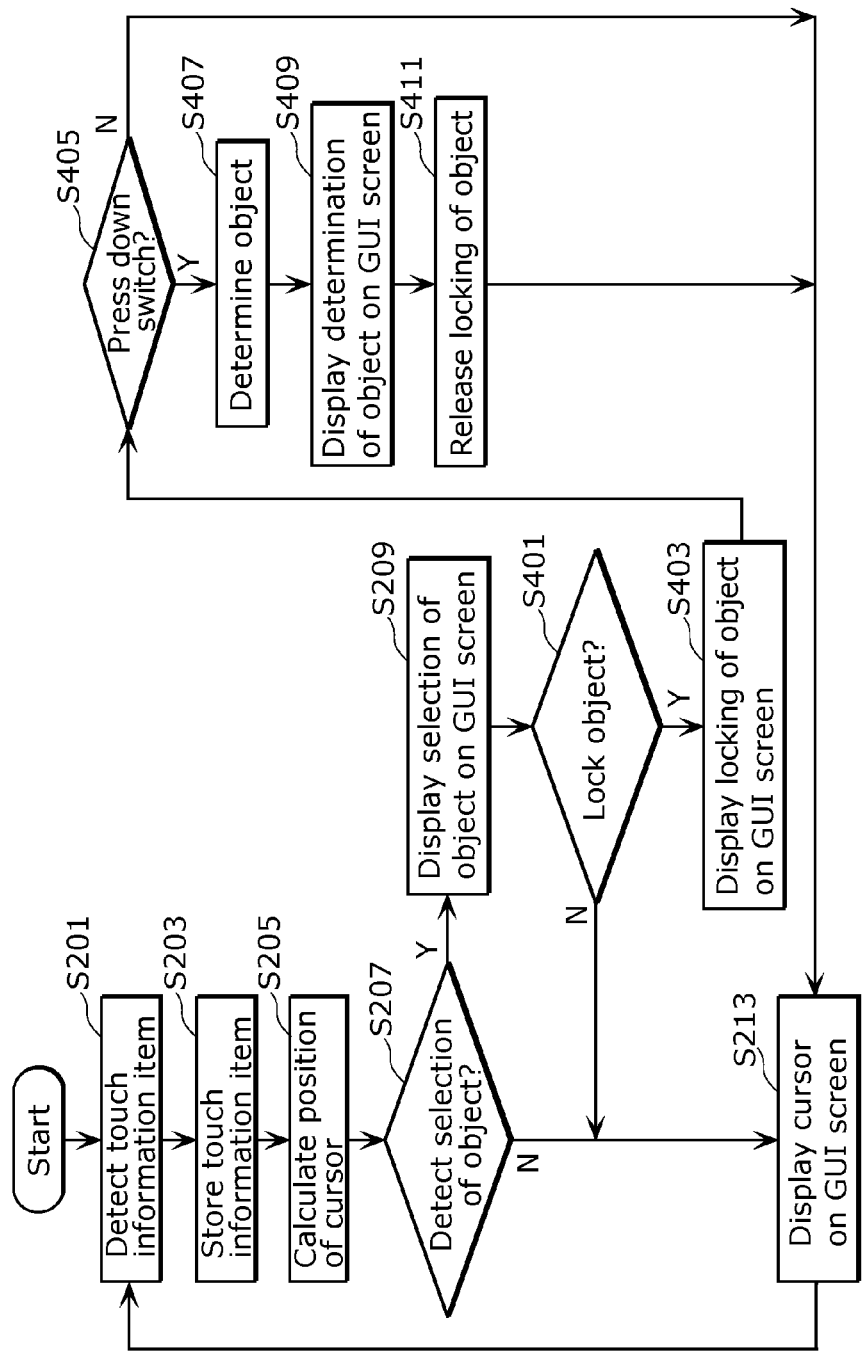
FIG. 15 is a flowchart of processes performed by the information input device according to Embodiment 3.

FIG. 15 is a flowchart of processes performed by the information input device 200 according to Embodiment 3.

Here, FIG. 15 will describe a series of operations in which the user selects and determines (executes), using the clickable touch sensor 1, the target object 12(*b*) from among the objects 12(*a*) to 12(*c*) placed on the GUI screen 7 displayed by the screen display unit 6 as a specific example, as according to Embodiments 1 and 2.

Furthermore, the configuration of Embodiment 3 additionally includes the object lock control unit 18 instead of the pressing start position estimating unit 16 in FIG. 2 according to Embodiment 1, and the other constituent elements perform the same operations as according to Embodiment 1.

Specifically, in the series of operations in which the user selects (i.e. places the cursor 9 on the target object 12(*b*) in the GUI screen 7) and determines (presses the clickable touch sensor 1), using the clickable touch sensor 1, the target object 12(*b*) from among the objects 12(*a*) to 12(*c*) placed on the GUI screen 7 displayed by the screen display unit 6, operations performed by the constituent elements until the user selects the target object 12(*b*) are identical to those according to Embodiment 1.

Thus, the processes of the object lock determining unit 40 after the object lock determination process control unit 41 determines to lock an object will be described hereinafter.

Upon receipt of the ID number of the object 12(*b*) from the object selection detecting unit 14, the object lock determining unit 40 determines whether or not to prevent the user from selecting an object other than the object 12(*b*) based on the touch information item stored in the touch information sequence storage unit 5, that is, to lock the object 12(*b*) (S401 in FIG. 15).

When determining to lock the object, the object lock determining unit 40 outputs the object lock start information to the object selection detecting unit 14 and the object display control unit 13 (Yes at S401).

Upon receipt of the object lock start information from the object lock determining unit 40, the object selection detecting unit 14 locks the object 12(*b*) that is an object currently selected by the user.

Furthermore, upon receipt of the object lock start information from the object lock determining unit 40, the object display control unit 13 displays the object 12(*b*) that is an object corresponding to the ID number obtained from the object selection detecting unit 14, for example, presents that the object 12(*b*) has been locked to the user by changing the size and color, etc of the object (S403).

Furthermore, with the touch sensor 2 pressed down and the switch 3 turned ON to determine the object 12(*b*) selected by the user (Yes at S405), the switch 3 outputs the pressing information to the object selection detecting unit 14 and the object lock determining unit 40.

As in FIG. 2 according to Embodiment 1, upon receipt of the pressing information from the switch 3, the object selection detecting unit 14 outputs the ID number of the object 12(*b*) detected (that is, overlapped by the cursor 9), to the object determining unit 15.

Upon receipt of the ID number of the object 12(*b*) from the object selection detecting unit 14, assuming that the user determines the object 12(*b*), the object determining unit 15 outputs the ID number to the object display control unit 13 and performs a determination process corresponding to the object 12(*b*) (S407).

Upon receipt of the ID number of the object 12(*b*) from the object determining unit 15, the object display control unit 13 displays the object 12(*b*) on the GUI screen 7, for example, presents determination of the object 12(*b*) to the user by changing the size and color of the object (S409).

Furthermore, upon receipt of the pressing information from the switch 3, the object lock determining unit 40 outputs the object lock stop information to the object selection detecting unit 14 (S411).

Upon receipt of the object lock stop information from the object lock determining unit 40, the object selection detecting unit 14 releases (stops) current locking of the object 12(*b*) so that the user can select objects other than the object 12(*b*) again.

Here, the object lock determining unit 40 can output the object lock stop information after outputting the object lock start information.

Similarly, the object lock determining unit 40 can output the object lock start information in an initial state in which none of the objects is selected, or after outputting the object lock stop information.

In other words, the process of outputting the object lock start information and the object lock stop information is a toggle process.

As described above, the information input device 200 according to Embodiment 3 detects that the user's finger is to press the touch sensor 2 and locks an object selected by the user to prevent the user from selecting an object other than the selected object before the user's finger starts to press the switch 3. Thus, even when the user's finger pressed the switch 3 and the finger was slightly displaced with the pressure of the finger, the object selected by the user can be reliably determined, and an erroneous operation caused by the misclick can be reduced.

Furthermore, a touch position changing operation can be performed by moving the finger on the touch sensor 2 unless the user completely presses down the switch 3 according to Embodiment 3. The method is different from the conventional information input method for preventing the misclick by detecting an operation of the user who intends to press the switch 3 with pressure of the user's finger to the touch sensor 3 and invalidating the touch position changing operation by the movement of the user's finger.

In other words, even when the user moves the finger on the touch sensor 2 and somewhat strongly presses the touch sensor 2, the user can successively input touch positions, that is, continuously move the cursor 9 on the GUI screen 7. Thus, the operability can be more improved than that of the conventional information input device.

Furthermore, although the conventional information input device needs the special touch sensor 101 that can detect the pressure of the user's finger, the touch sensor 2 that is generally used for detecting a position of a finger can also prevent the misclick according to Embodiment 3.

Although the object lock control unit 18 according to Embodiment 3 determines to cause the object lock determining unit 40 to perform the object lock determination process, using the object lock determination process control unit 41, the object lock determining unit 40 may always perform the object lock determination process without the object lock determination process control unit 41.

Furthermore, although the object lock determination process control unit 41 determines to perform the object lock determination process, using the object placement information of the object detected by the object selection detecting unit 14 and the position of the cursor 9 obtained from the screen display unit 6, the determination may be further made using object placement information of at least one object closer to the detected object.

The determination method will be specifically described as Modification of Embodiment 3.

(Modification of Embodiment 3)

For example, assume the objects closer to the object 12(*b*) detected by the object selection detecting unit 14, to be the objects 12(*a*) and 12(*c*) as in the GUI screen 7 illustrated in FIG. 11.

Here, the object lock determination process control unit 41 reads the object placement information of each of the objects 12(*a*) to 12(*c*) from the object placement storage unit 11, and determines gaps G(ab) and G(bc) in layout between the object 12(*a*) and the detected object 12(*b*) and between the objects 12(*b*) and 12(*c*). Here, the objects 12(*a*) and 12(*c*) are closer to the object 12(*b*).

As described above, the object lock determination process control unit 41 determines to perform the object lock determination process using Expression 7.

More specifically, the object lock determination process control unit 41 changes the maximum displacement width B of the cursor position subject to the misclick by the user's finger, according to the gaps G(ab) and G(bc) in layout, not according to a predetermined fixed value.

More specifically, the object lock determination process control unit 41 compares each of the gaps G(ab) and G(bc) with predetermined two thresholds Gs and Gb, where Gs<Gb.

In other words, when the gaps G(ab) and G(bc) are smaller than the threshold Gs, an erroneous operation caused by the misclick is more frequently performed. Thus, the misclick correction control unit 17 sets the maximum displacement width B to be smaller than the normal case in order to more frequently perform the object lock determination process.

Furthermore, when the gaps G(ab) and G(bc) are larger than the threshold Gb, the erroneous operation caused by the misclick is less frequently performed. Thus, the misclick correction control unit 17 sets the maximum displacement width B to be larger than the normal case in order to less frequently perform the object lock determination process.

As such, the misclick correction control unit 17 dynamically changes the threshold to determine whether or not to perform the object lock determination process, based on a placement relationship between an object currently selected by the user and an object closer to the selected object in addition to the cursor position and the object placement information of the selected object. Thus, the information input device with a superior response speed and less erroneous operation caused by the misclick can be provided.

Although each of the processing units other than the clickable touch sensor 1 including the touch sensor 2 and the switch 3 and the screen display unit 6 that displays the GUI screen 7 including the cursor 9 and the objects 12(*a*) to 12(*c*) is implemented by dedicated hardware according to each of Embodiments, functions similar to those of the processing units may be implemented in a software manner using a computer, instead of the hardware.

More specifically, the information input device described Embodiments 1 to 3 and Modifications can be implemented by a computer.

Figure 16:
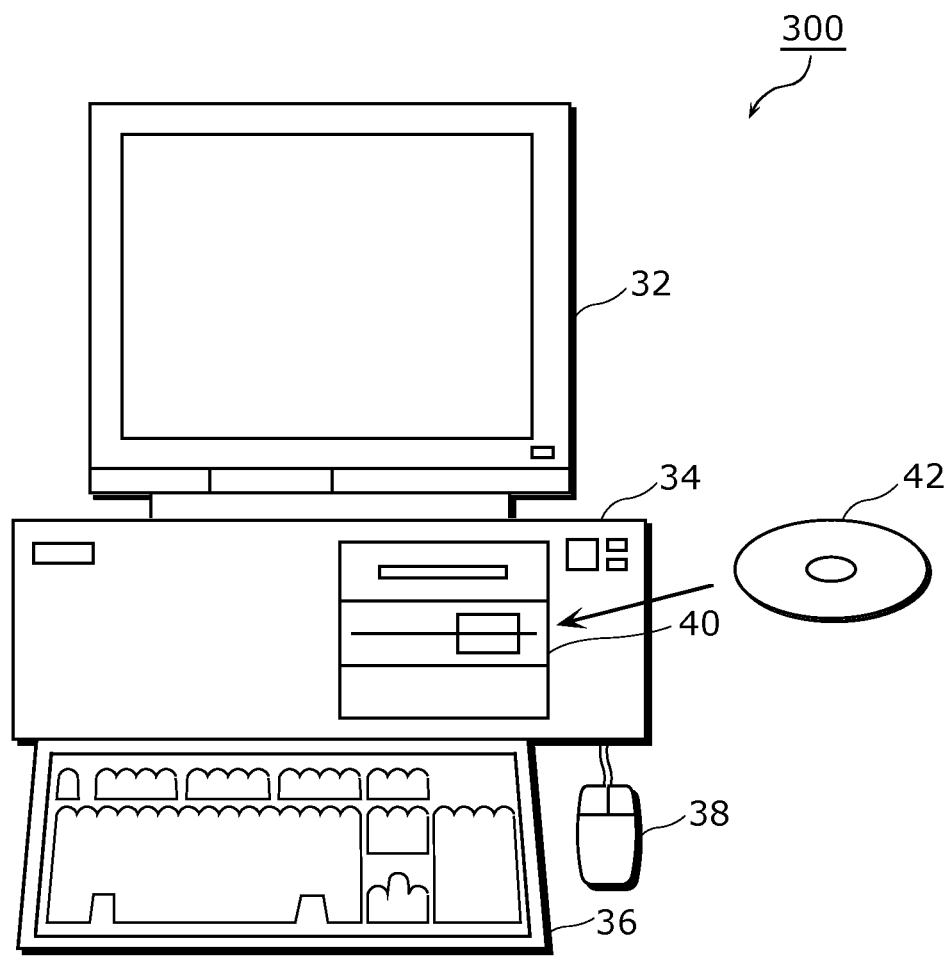
FIG. 16 is an external view illustrating an exemplary computer system for implementing the information input device according to respective Embodiments 1 to 3 and Modifications in the present invention.

As shown by FIG. 16, the information input device 200 includes: a computer 34; a keyboard 36 and a mouse 38 for instructing the computer 34; a display 32 for displaying information such as computational results of the computer 34; a Compact Disc-Read only memory (CD-ROM) device 40 for reading programs to be executed by the computer 34; and a communication modem (not shown).

The programs that are processes performed by the information input device 200 are recorded on a CD-ROM 42, a computer-readable recording medium, and are read by the CD-ROM device 40. Alternatively, the programs are read by the communication modem via a computer network 26.

Figure 17:
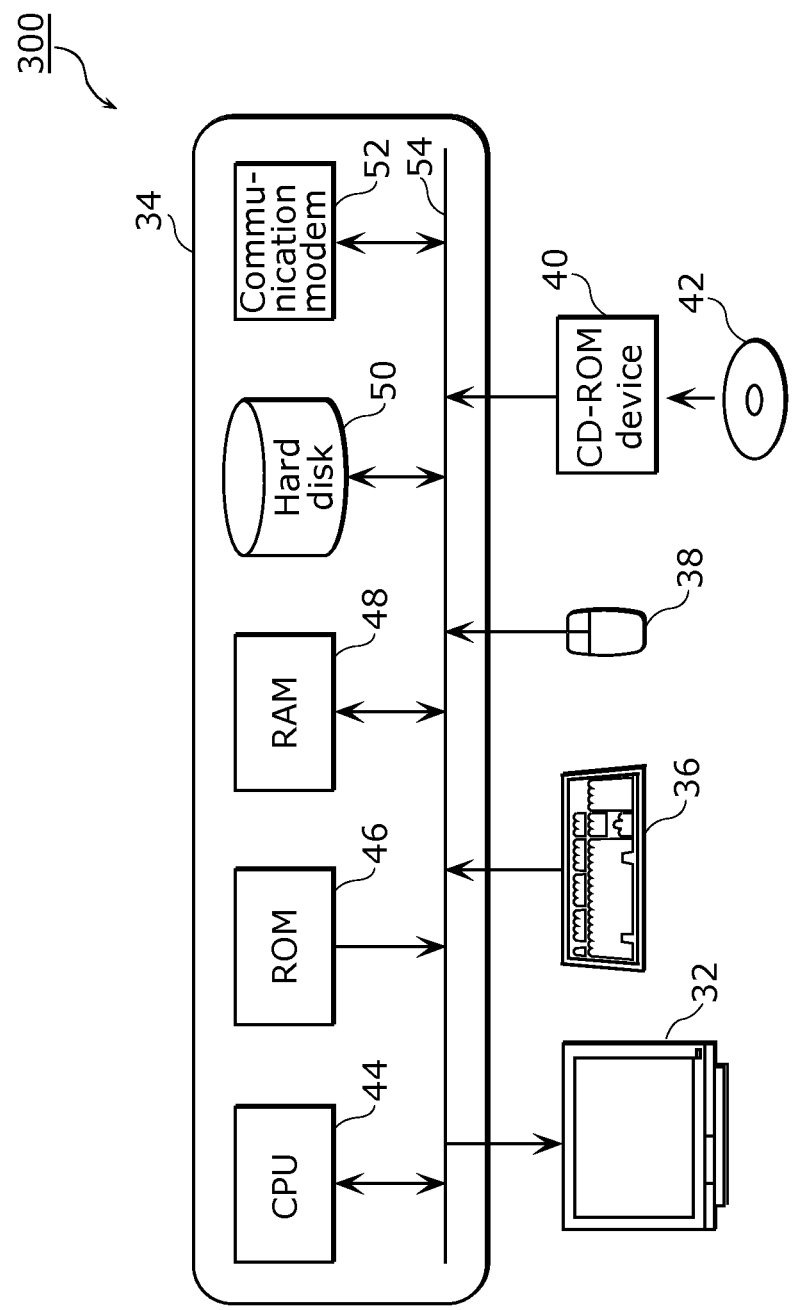
FIG. 17 is an external view illustrating a hardware configuration of a computer system for implementing the information input device according to respective Embodiments 1 to 3 and Modifications in the present invention.
Figure 18:
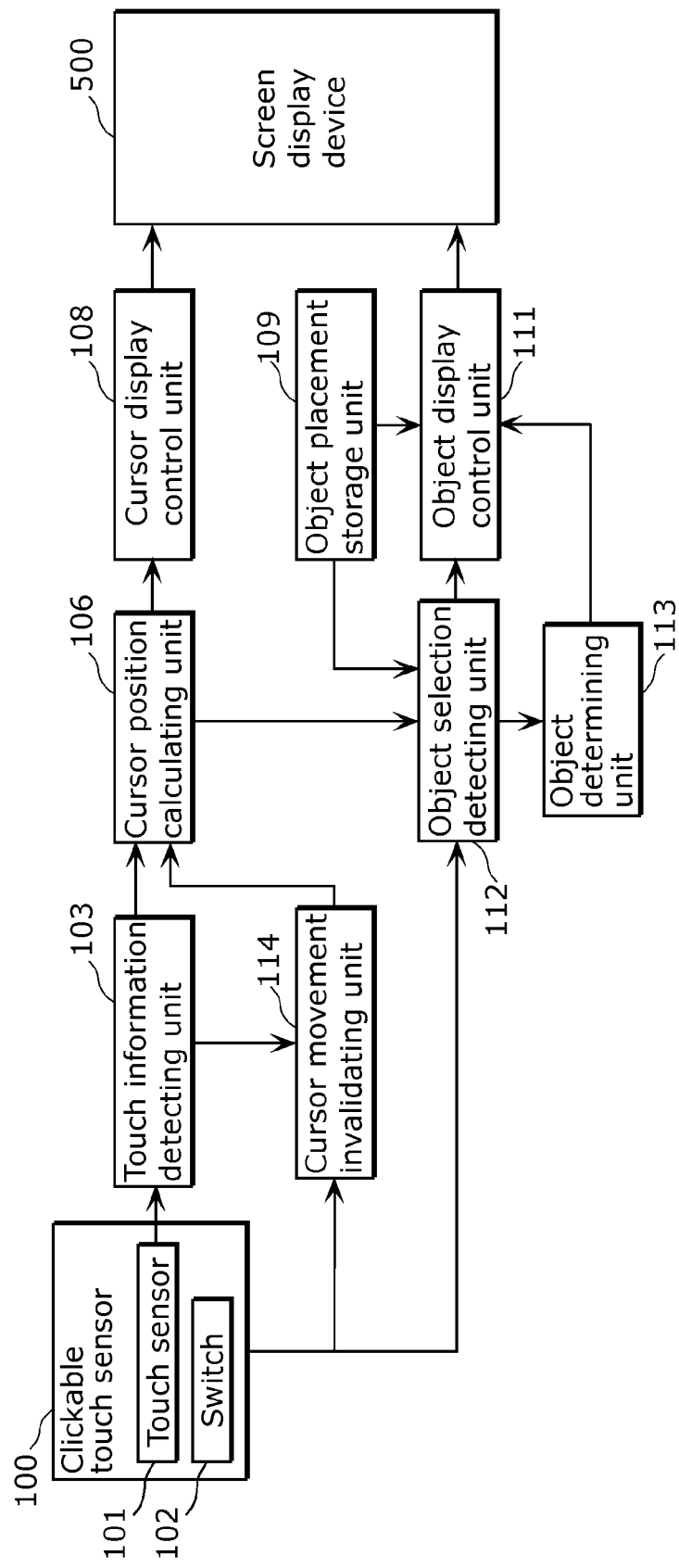
FIG. 18 is a block diagram illustrating a configuration of an information input device according to a related art of the present invention.
Figure 19:
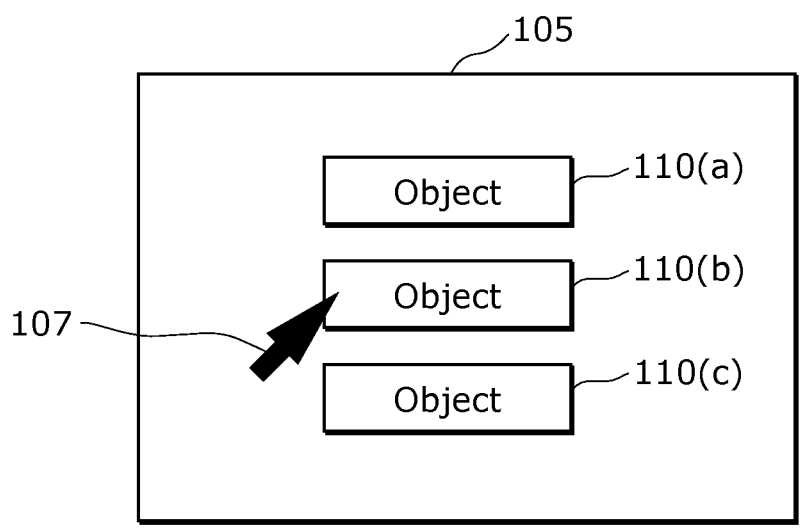
FIG. 19 is an external view of a GUI screen of the information input device according to the related art.

FIG. 17 is a block diagram showing a hardware configuration of a computer system which implements the information input device 200. The computer 34 includes a Central Processing Unit (CPU) 44, a Read Only Memory (ROM) 46, a Random Access Memory (RAM) 48, a hard disk 50, a communication modem 52, and a bus 54.

The CPU 44 executes programs read via the CD-ROM device 40 or the communication modem 52. The ROM 46 stores programs or data necessary for operations performed by the computer 34. The RAM 48 stores data such as parameters at the time of program execution. The hard disk 50 stores the programs, the data, and so on. The communication modem 52 communicates with other computers via the computer network 26. The bus 54 connects the CPU 44, the ROM 46, the RAM 48, the hard disk 50, the communication modem 52, the display 32, the keyboard 36, the mouse 38, and the CD-ROM device 40 to each other.

Moreover, part or all of the constituent elements included in each of the above devices may be included in one system Large Scale Integration (LSI). The system LSI is a super-multifunctional LSI manufactured by integrating components on one chip and is, specifically, a computer system including a micro processing unit, a ROM, and a RAM. The RAM stores a computer program. The micro processing unit operates according to the computer program, so that the system LSI fulfills its function.

Furthermore, part or all of the constituent elements included in each of the above devices may be included in an IC card removable from each of the devices or in a stand alone module. The IC card or the module is the computer system including the micro processing unit, the ROM, and the RAM. The IC card or the module may include the super-multifunctional LSI. The micro processing unit operates according to the computer program, so that the IC card or the module fulfills its function. The IC card or the module may have tamper-resistance.

Moreover, the present invention may be any of the above methods. Furthermore, the present invention may be a computer program which causes a computer to execute these methods, and a digital signal which is composed of the computer program.

Moreover, in the present invention, the computer program or the digital signal may be recorded on a computer-readable recording medium such as a flexible disk, a hard disk, a CD-ROM, an MO, a DVD, a DVD-ROM, a DVD-RAM, a BD (Blu-ray Disc®), a USB memory, a memory card such as a SD card, and a semiconductor memory. In addition, the digital signal may be recorded on these recording media.

Furthermore, in the present invention, the computer program or the digital signal may be transmitted via an electronic communication line, a wireless or wired communication line, a network represented by the Internet, data broadcasting, and the like.

Moreover, the present invention may be a computer system including a micro processing unit and a memory. The memory may store the computer program, and the micro processing unit may operate according to the computer program.

Furthermore, the present invention may execute the computer program or the digital signal in another independent computer system by recording the computer program or the digital signal on the recording medium and transmitting the recorded computer program or digital signal or by transmitting the computer program or the digital signal via the network and the like.

Furthermore, Embodiments and Modifications above may be combined with each other.

It should be considered that Embodiments disclosed herein are exemplary in all respects and not restrictive at all. It is intended that the scope of the present invention is indicated by not the above description of Embodiments but Claims, and includes any change within Claims, the meanings of equivalents, and the scope of the equivalents.

INDUSTRIAL APPLICABILITY

The present invention relates to, for example, an information input device that operates a GUI screen of an electronic device, and in particular to an information input device including a clickable touch sensor that operates the GUI screen using a touch sensor.

REFERENCE SIGNS LIST

1 Clickable touch sensor
2 Touch sensor
3 Switch
4 Touch information detecting unit
5 Touch information sequence storage unit
6 Screen display unit
7 GUI screen
8 Cursor position calculating unit
9 Cursor
10 Cursor display control unit
11 Object placement storage unit
12(a) to 12(c) Object
13 Object display control unit
14 Object selection detecting unit
15 Object determining unit
16 Pressing start position estimating unit
17 Misclick correction control unit
18 Object lock control unit
20 Pressing start time estimating unit
21 Movement amount calculating unit
22 Stop time detecting unit
23 Touch position determining unit
24 Touch area calculating unit
25 Pressed area arrival time detecting unit
26 Pressing start time determining unit
30 Moving direction calculating unit
31 Misclick start time detecting unit
40 Object lock determining unit
41 Object lock determination process control unit
42 Object lock information generating unit
100 Clickable touch sensor
101 Touch sensor
102 Switch
103 Touch information detecting unit
105 GUI screen
106 Cursor position calculating unit
107 Cursor
108 Cursor display control unit
109 Object placement storage unit
110(a) to 110(c) Object
111 Object display control unit
112 Object selection detecting unit
113 Object determining unit
114 Cursor movement invalidating unit
200 Information input device
300 Screen display device
400 Screen control unit
500 Screen display device

The invention claimed is:
1. An information input device including a clickable touch sensor including a touch sensor that can be vertically moved and a switch that is placed vertically downward with respect to an operation surface of the touch sensor and is pressed down by a user pressing the touch sensor, the information input device comprising:
a touch information detecting unit configured to detect a touch information item obtained when a finger of the user is in contact with the touch sensor;
a touch information sequence storage unit configured to store the touch information item for a predetermined period; and
a pressing start position estimating unit configured to estimate a pressing start position at which the user started to press the touch sensor with the finger, based on touch information items stored in the touch information sequence storage unit, when the switch was pressed down, the touch information items including the touch information item,
wherein the pressing start position estimating unit includes:
a pressing start time estimating unit configured to estimate a pressing start time at which the user started to press the touch sensor with the finger, based on the touch information items stored in the touch information sequence storage unit, when the switch was pressed down; and
a touch position determining unit configured to determine a contact position between the finger of the user and the touch sensor at the pressing start time, with reference to the touch information items stored in the touch information sequence storage unit.

2. The information input device according to claim 1,
wherein the pressing start time estimating unit includes:
a movement amount calculating unit configured to calculate at least one type of an amount of movement of the finger on the touch sensor, based on the touch information items stored in the touch information sequence storage unit; and
a stop time detecting unit configured to estimate a time at which the finger stopped, based on the amount of movement.

3. The information input device according to claim 2,
wherein each of the touch information items includes a touch position that is a position at which the finger was in contact with the touch sensor,
the movement amount calculating unit is configured to calculate a movement speed of the finger as the amount of movement, using a first touch position and a second touch position that are included in the touch information items, and
the stop time detecting unit is configured to determine, as the time at which the finger stopped, a time at which the movement speed is lower than or equal to a predetermined value to estimate the determined time as the pressing start time.

4. The information input device according to claim 3,
wherein the pressing start time estimating unit further includes:
a touch area calculating unit configured to determine a touch area that is an area of the touch sensor in contact with the finger, based on the touch information items stored in the touch information sequence storage unit;
a pressed area arrival time detecting unit configured to determine a pressed area arrival time at which the touch area obtained from the touch area calculating unit reached a predetermined threshold; and
a pressing start time determining unit configured to determine the pressing start time at which the user started to press the touch sensor with the finger, using the time estimated by the stop time detecting unit and the pressed area arrival time determined by the pressed area arrival time detecting unit.

5. The information input device according to claim 1,
wherein the pressing start time estimating unit includes:
a movement amount calculating unit configured to calculate at least one type of an amount of movement of the finger on the touch sensor, based on the touch information items stored in the touch information sequence storage unit; and
a misclick start time detecting unit configured to detect presence or absence of misclick of the finger on the touch sensor, using the amount of movement, and determine, when detecting the presence of the misclick, a time immediately previous to a time at which the user misclicked.

6. The information input device according to claim 5,
wherein the pressing start time estimating unit further includes a moving direction calculating unit configured to calculate a moving direction of the finger on the touch sensor, based on the touch information items stored in the touch information sequence storage unit, and
the misclick start time detecting unit is configured to detect the presence or absence of the misclick of the finger on the touch sensor, using the amount of movement obtained from the movement amount calculating unit and the moving direction obtained from the moving direction calculating unit, and determine, when detecting the presence of the misclick, a time immediately previous to the time at which the user misclicked, using the amount of movement and the moving direction.

7. The information input device according to claim 6,
wherein the pressing start time estimating unit further includes:
a touch area calculating unit configured to determine a touch area that is an area of the touch sensor in contact with the finger, based on the touch information items stored in the touch information sequence storage unit; and
a pressed area arrival time detecting unit configured to determine a pressed area arrival time at which the touch area obtained from the touch area calculating unit reached a predetermined threshold, and
the misclick start time detecting unit is configured to detect the presence or absence of the misclick of the finger on the touch sensor, using the pressed area arrival time obtained from the pressed area arrival time detecting unit, the amount of movement obtained from the movement amount calculating unit, and the moving direction obtained from the moving direction calculating unit, and determine, when detecting the presence of the misclick, a time immediately previous to the time at which the user misclicked, using the amount of movement and the moving direction.

8. The information input device according to claim 1, further comprising
a cursor position calculating unit configured to calculate a position of a cursor on a graphical user interface (GUI) screen, based on the touch information items stored in the touch information sequence storage unit or the pressing start position estimated by the pressing start position estimating unit.

9. The information input device according to claim 8, further comprising:
an object placement storage unit configured to store object placement information indicating an area of the GUI screen in which at least one object is placed;

an object display control unit configured to display the at least one object on the GUI screen based on the object placement information obtained from the object placement storage unit; and an object selection detecting unit configured to detect an object selected by the user from among the at least one object, based on the object placement information and the position of the cursor obtained from the cursor position calculating unit.

10. The information input device according to claim 9, further comprising a misclick correction control unit configured to determine whether or not the pressing start position estimating unit estimates the pressing start position, based on object placement information of the object detected by the object selection detecting unit and the position of the cursor obtained from the cursor position calculating unit.

11. The information input device according to claim 9, further comprising a misclick correction control unit configured to determine whether or not the pressing start position estimating unit estimates the pressing start position, based on object placement information between a first object detected by the object selection detecting unit and at least one second object closer to the first object.

12. An information input method using a clickable touch sensor including a touch sensor that can be vertically moved and a switch that is placed vertically downward with respect to an operation surface of the touch sensor and is pressed down by a user pressing the touch sensor, the information input method comprising:

detecting a touch information item obtained when a finger of the user is in contact with the touch sensor;

storing the touch information item for a predetermined period; and estimating a pressing start position at which the user started to press the touch sensor, based on touch information items stored in the storing, when the switch was pressed down, the touch information items including the touch information item, wherein the estimating includes:

estimating a pressing start time at which the user started to press the touch sensor with the finger, based on the touch information items stored in the storing, when the switch was pressed down; and determining a contact position between the finger of the user and the touch sensor at the pressing start time, with reference to the touch information items stored in the storing.

13. A computer-readable recording medium on which a program is recorded, the program causing a computer to execute the information input method according to claim 12.

14. An integrated circuit for inputting information using a clickable touch sensor including a touch sensor that can be vertically moved and a switch that is placed vertically downward with respect to an operation surface of the touch sensor and is pressed down by a user pressing the touch sensor, the integrated circuit comprising:

a touch information detecting unit configured to detect a touch information item obtained when a finger of the user is in contact with the touch sensor;

a touch information sequence storage unit configured to store the touch information item for a predetermined period; and a pressing start position estimating unit configured to estimate a pressing start position at which the user started to press the touch sensor, based on touch information items stored in the touch information sequence storage unit, when the switch was pressed down, the touch information items including the touch information item, wherein the pressing start position estimating unit includes:

a pressing start time estimating unit configured to estimate a pressing start time at which the user started to press the touch sensor with the finger, based on the touch information items stored in the touch information sequence storage unit, when the switch was pressed down; and a touch position determining unit configured to determine a contact position between the finger of the user and the touch sensor at the pressing start time, with reference to the touch information items stored in the touch information sequence storage unit.

15. An information input device including a clickable touch sensor including a touch sensor that can be vertically moved and a switch that is placed vertically downward with respect to an operation surface of the touch sensor and is pressed down by a user pressing the touch sensor, the information input device comprising:

a touch information detecting unit configured to detect a touch information item obtained when a finger of the user is in contact with the touch sensor;

a touch information sequence storage unit configured to store the touch information item for a predetermined period;

an object placement storage unit configured to store object placement information indicating an area of a GUI screen in which at least one object is placed;

an object display control unit configured to display the at least one object on the GUI screen based on the object placement information obtained from the object placement storage unit;

a cursor position calculating unit configured to calculate a position of a cursor on the GUI screen, based on the touch information items stored in the touch information sequence storage unit;

an object selection detecting unit configured to detect an object selected by the user from among the at least one object, based on the object placement information and the position of the cursor obtained from the cursor position calculating unit; and an object lock control unit configured to determine whether or not to prevent the user from selecting an object other than the object selected by the user and detected by the object selection detecting unit, based on the touch information items stored in the touch information sequence storage unit, wherein the object other than the object selected by the user is around the object selected by the user on the GUI screen.

16. The information input device according to claim 15, wherein the object lock control unit includes:

an object lock determining unit configured to perform an object lock determination process for determining whether or not to prevent the user from selecting the object other than the object detected by the object selection detecting unit, based on the touch information items stored in the touch information sequence storage unit; and an object lock determination process control unit configured to determine whether or not to perform the object lock determination process, based on placement information of the object detected by the object selection detecting unit and the position of the cursor obtained from the cursor position calculating unit.

17. The information input device according to claim 15, wherein the object lock control unit includes:

an object lock determining unit configured to perform an object lock determination process for determining whether or not to prevent the user from selecting the object other than the object detected by the object selection detecting unit, based on the touch information items stored in the touch information sequence storage unit; and an object lock determination process control unit configured to determine whether or not to perform the object lock determination process, based on placement information between a third object detected by the object selection detecting unit and at least one fourth object closer to the detected third object.

18. The information input device according to claim 16, wherein the object lock determining unit includes:

a movement amount calculating unit configured to calculate at least one type of an amount of movement of the finger on the touch sensor, based on the touch information items stored in the touch information sequence storage unit; and an object lock information generating unit configured to determine whether or not to prevent the user from selecting the object other than the object detected by the object selection detecting unit, based on the amount of movement, and generate object lock information according to a result of the determination.

* * * * *